(12) United States Patent
Sakamoto et al.

(10) Patent No.: US 10,155,428 B2
(45) Date of Patent: Dec. 18, 2018

(54) REFRIGERATION CYCLE DEVICE

(71) Applicant: DENSO CORPORATION, Kariya, Aichi-pref. (JP)

(72) Inventors: Kota Sakamoto, Kariya (JP); Shin Nishida, Kariya (JP); Michio Nishikawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/531,663

(22) PCT Filed: Dec. 8, 2015

(86) PCT No.: PCT/JP2015/006074
§ 371 (c)(1),
(2) Date: May 30, 2017

(87) PCT Pub. No.: WO2016/103595
PCT Pub. Date: Jun. 30, 2016

(65) Prior Publication Data
US 2017/0326947 A1    Nov. 16, 2017

(30) Foreign Application Priority Data

Dec. 24, 2014  (JP) .................................. 2014-260493

(51) Int. Cl.
*F25D 31/00* (2006.01)
*B60H 1/00* (2006.01)
(Continued)

(52) U.S. Cl.
CPC ..... *B60H 1/00921* (2013.01); *B60H 1/00342* (2013.01); *B60H 1/12* (2013.01);
(Continued)

(58) Field of Classification Search
CPC .......... F25B 39/04; F25B 31/00; F25B 40/00; B60H 1/00921; B60H 1/00342;
(Continued)

(56) References Cited

U.S. PATENT DOCUMENTS 5,209,081 A * 5/1993 Matsuoka .......... B60H 1/00764
62/244
5,299,431 A    4/1994 Iritani et al.
(Continued)

FOREIGN PATENT DOCUMENTS

EP      2708390 A1    3/2014
JP    H02056711 U    4/1990
(Continued)

*Primary Examiner* — Melvin Jones
(74) *Attorney, Agent, or Firm* — Harness, Dickey & Pierce, P.L.C.

(57) ABSTRACT

A refrigeration cycle device has a compressor, a radiator, an auxiliary heat exchanger, a decompressor, an evaporator, and an interior heat exchanger. The auxiliary heat exchanger performs a heat exchange between refrigerant and air and causes the refrigerant to radiate heat. The evaporator performs a heat exchange between air and refrigerant after being decompressed in the decompressor before the air is heated in the auxiliary heat exchanger. The interior heat exchanger has a first heat exchanging portion and a second heat exchanging portion and performs a heat exchange between refrigerant flowing in the first heat exchanging portion and refrigerant flowing in the second heat exchanging portion. The first heat exchanging portion is disposed in a refrigerant path between the radiator and the decompressor and is connected to the auxiliary heat exchanger in series. The second heat exchanging portion is disposed in a refrigerant path between the evaporator and the compressor.

8 Claims, 12 Drawing Sheets

(51) Int. Cl.
*B60H 1/12* (2006.01)
*F25B 6/04* (2006.01)
*F25B 40/00* (2006.01)
*F28D 7/10* (2006.01)
*F28D 9/00* (2006.01)
*F28D 21/00* (2006.01)

(52) U.S. Cl.
CPC ............... *F25B 6/04* (2013.01); *F25B 40/00* (2013.01); *B60H 2001/00957* (2013.01); *F28D 7/106* (2013.01); *F28D 9/00* (2013.01); *F28D 2021/0068* (2013.01); *F28F 2210/06* (2013.01); *Y02T 10/88* (2013.01)

(58) Field of Classification Search
CPC ............ B60H 1/12; B60H 2001/00957; F28D 7/106; F28D 9/00; F28D 2021/0068; F28F 2210/06; Y02T 10/66
USPC ..................................................... 62/507, 244
See application file for complete search history.

(56) References Cited

U.S. PATENT DOCUMENTS

| | | |
|---|---|---|
| 5,605,051 A | 2/1997 | Iritani et al. |
| 5,642,627 A | 7/1997 | Iritani et al. |
| 5,685,162 A | 11/1997 | Iritani et al. |
| 5,983,652 A | 11/1999 | Iritani et al. |
| 6,044,653 A | 4/2000 | Iritani et al. |
| 6,212,900 B1* | 4/2001 | Iritani ................. B60H 1/00021 62/186 |
| 6,430,951 B1* | 8/2002 | Iritani ................. B60H 1/00021 62/160 |
| 2004/0026071 A1 | 2/2004 | Hesse et al. |
| 2006/0137388 A1 | 6/2006 | Kakehashi et al. |
| 2010/0206001 A1 | 8/2010 | Takahashi et al. |
| 2014/0318170 A1* | 10/2014 | Katoh ....................... F28F 9/26 62/324.5 |

FOREIGN PATENT DOCUMENTS

| | | |
|---|---|---|
| JP | H05008631 A | 1/1993 |
| JP | H05319077 A | 12/1993 |
| JP | 2003074996 A | 3/2003 |
| JP | 2004508525 A | 3/2004 |
| JP | 2006177632 A | 7/2006 |
| JP | 2008074388 A | 4/2008 |
| JP | 2015009652 A | 1/2015 |
| WO | WO-2012153610 A1 | 11/2012 |
| WO | WO-2016042699 A1 | 3/2016 |

\* cited by examiner

REFRIGERATION CYCLE DEVICE

CROSS REFERENCE TO RELATED APPLICATIONS

This application is a U.S. National Phase Application under 35 U.S.C. 371 of International Application No. PCT/JP2015/006074 filed on Dec. 8, 2015 and published in Japanese as WO 2016/103595 A1 on Jun. 30, 2016. This application is based on and claims the benefit of priority from Japanese Patent Application No. 2014-260493 filed on Dec. 24, 2014. The entire disclosures of all of the above applications are incorporated herein by reference.

TECHNICAL FIELD

The present disclosure relates to a refrigeration cycle device for air conditioning.

BACKGROUND ART

A vehicle air conditioner is known to adjusts a temperature of a conditioned air in a manner that an evaporator disposed in an air conditioning duct cools air, and a heater core located downstream of the evaporator in a flow direction of the air heats the air flowing out of the evaporator. The vehicle air conditioner is configured to include a refrigeration cycle device, and Patent Literature etc. discloses such a vehicle air conditioner. The refrigeration cycle device of the vehicle air conditioner disclosed in Patent Literature 1 has a condenser, an evaporator, and a subcooling heat exchanger. In addition, the vehicle air conditioner has a bypass passage disposed in the air conditioning duct and introducing a cool air from the evaporator. The bypass passage is arranged parallel to a ventilation path extending to the heater core and to a cool air bypass passage. The subcooling heat exchanger is disposed in the bypass passage. The bypass passage is open when an air mix door opens the ventilation path extending to the heater core, and refrigerant, which is condensed in the condenser, is further cooled in the subcooling heat exchanger.

PRIOR ART LITERATURES

Patent Literature

Patent Literature 1: JP H5-8631 A

SUMMARY OF INVENTION

According to the refrigeration cycle device described in Patent Literature 1, the refrigerant after being condensed in the condenser is further cooled in the subcooling heat exchanger. In other words, air after being cooled in the evaporator exchanges heat with the refrigerant in the subcooling heat exchanger. As a result, an enthalpy difference between an inlet and an outlet of the evaporator can be increased as compared to a configuration having no subcooling heat exchanger. That is, a power saving effect can be obtained by increasing the enthalpy difference.

However, a heat exchange between the air and the refrigerant is required to be performed in the subcooling heat exchanger to obtain the power saving effect. According to the vehicle air conditioner described in Patent Literature 1, the heat exchange is performed in the subcooling heat exchanger only when the air mix door opens the ventilation path extending to the heater core. As a result, the power saving effect may be obtained only in a re-heating in which air flowing from the evaporator is heated in the subcooling heat exchanger and the heater core. In other words, the power saving effect cannot be obtained in a MAXCOOL (i.e., in a maximum cooling performance) in which the air flowing form the evaporator is blown into a vehicle compartment without being heated, and thereby a usage scene for using the subcooling heat exchanger to obtain the power saving effect is limited.

The present disclosure addresses the above issues, and it is an objective of the present disclosure to provide a refrigeration cycle device that can obtain a power saving effect by increasing the above-described enthalpy difference even in a usage scene in which a heat radiation from a refrigerant in a subcooling heat exchanger is restricted.

A refrigeration cycle device according to the present disclosure has a compressor, a radiator, an auxiliary heat exchanger, a decompressor, an evaporator, and an interior heat exchanger.

The compressor draws a refrigerant and discharges the refrigerant after compressing the refrigerant. The radiator causes the refrigerant, which is discharged by the compressor, to radiate heat. The auxiliary heat exchanger performs a heat exchange between the refrigerant flowing from the radiator and air to be blown to an air-conditioning target space, and causes the refrigerant to further radiate heat. The decompressor decompresses the refrigerant flowing from the auxiliary heat exchanger. The evaporator performs a heat exchange between air and the refrigerant after being decompressed in the decompressor, before the air is heated by heat that is radiated from the refrigerant in the auxiliary heat exchanger. The evaporator cools the air before being heated and evaporates the refrigerant. The evaporator causes the refrigerant after exchanging heat to flow to the compressor. The interior heat exchanger has a first heat exchanging portion and a second heat exchanging portion and performs a heat exchange between refrigerant flowing in the first heat exchanging portion and refrigerant flowing in the second heat exchanging portion. The first heat exchanging portion is disposed in a refrigerant path between the radiator and the decompressor, and is connected to the auxiliary heat exchanger in series. The second heat exchanging portion is disposed in a refrigerant path between the evaporator and the compressor.

According to the present disclosure, the refrigeration cycle device has the interior heat exchanger that performs a heat exchange between refrigerant flowing through the first heat exchanging portion and refrigerant flowing through the second heat exchanging portion, in addition to the auxiliary heat exchanger that causes the refrigerant flowing from the radiator to radiate heat by performing a heat exchange between the refrigerant and air to be blown into the vehicle compartment. The interior heat exchanger has the first heat exchanging portion, which is disposed in the refrigerant path between the radiator and the decompressor and connected to the auxiliary heat exchanger in series, and the second heat exchanging portion, which is disposed in the refrigerant path between the evaporator and the compressor. Therefore, an enthalpy difference between an enthalpy at an inlet of the evaporator and an enthalpy at an outlet of the evaporator can be increased by performing the heat exchange between the refrigerant flowing in the first heat exchanging portion and the refrigerant flowing in the second heat exchanging portion in the interior heat exchanger, even in the usage scene in which a heat radiation from the refrigerant in the auxiliary heat exchanger is restricted. As a result, a power saving effect can be obtained by increasing the enthalpy difference.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number, and a redundant description may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
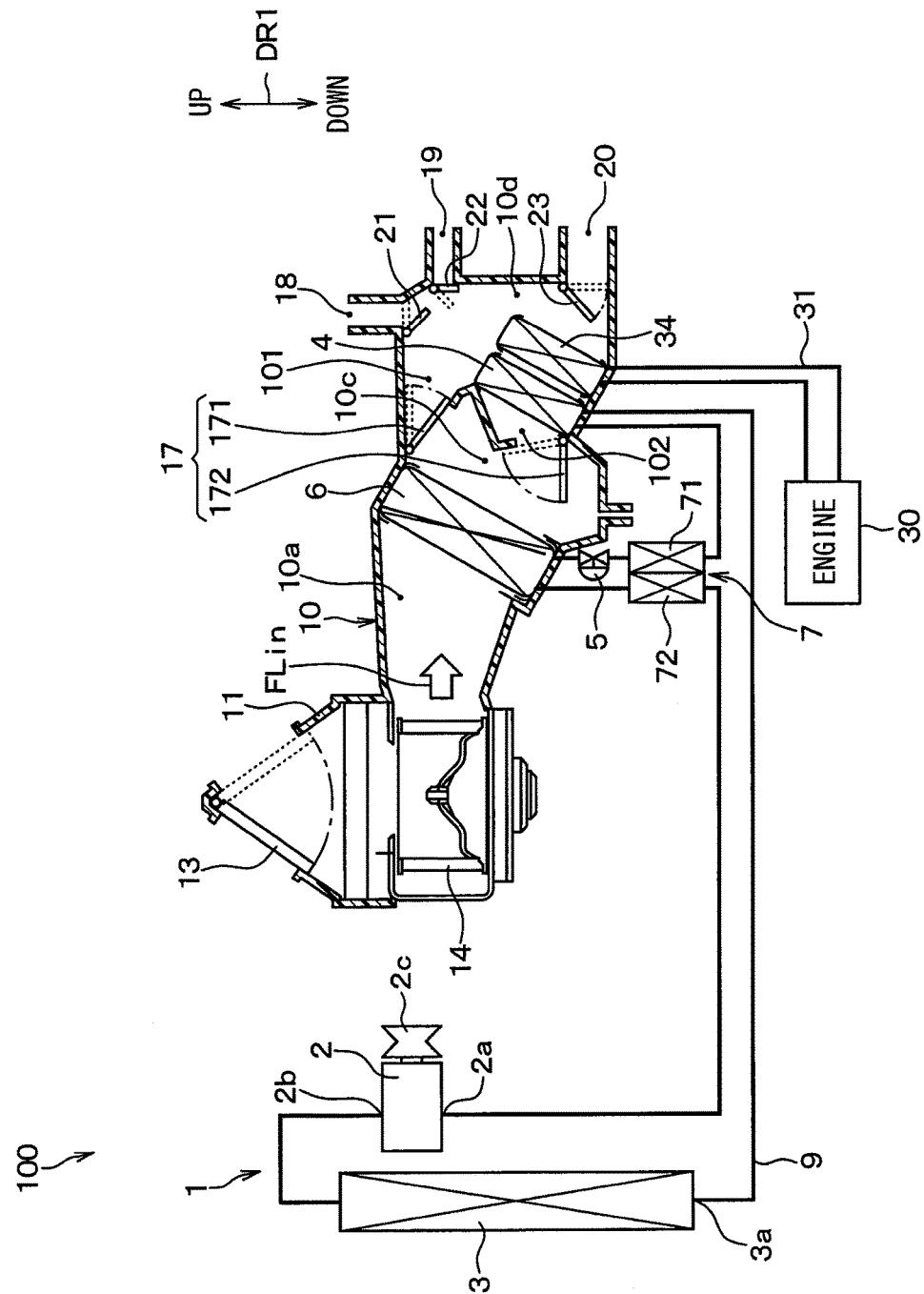
FIG. 1 is a schematic diagram illustrating a schematic configuration of a vehicle air conditioner according to a first embodiment.

FIG. 1 is a schematic diagram illustrating a schematic configuration of a vehicle air conditioner 100 according to a first embodiment. The vehicle air conditioner 100 illustrated in FIG. 1 is mounted, e.g., in a vehicle having an engine 30 as an internal combustion engine for moving and performs an air conditioning for a vehicle compartment, i.e., an interior space of the vehicle. The vehicle compartment is an air-conditioning target space that is a target for the air conditioning performed by the vehicle air conditioner 100. The engine 30 also functions as a heat generator mounted in the vehicle.

Figure 4:
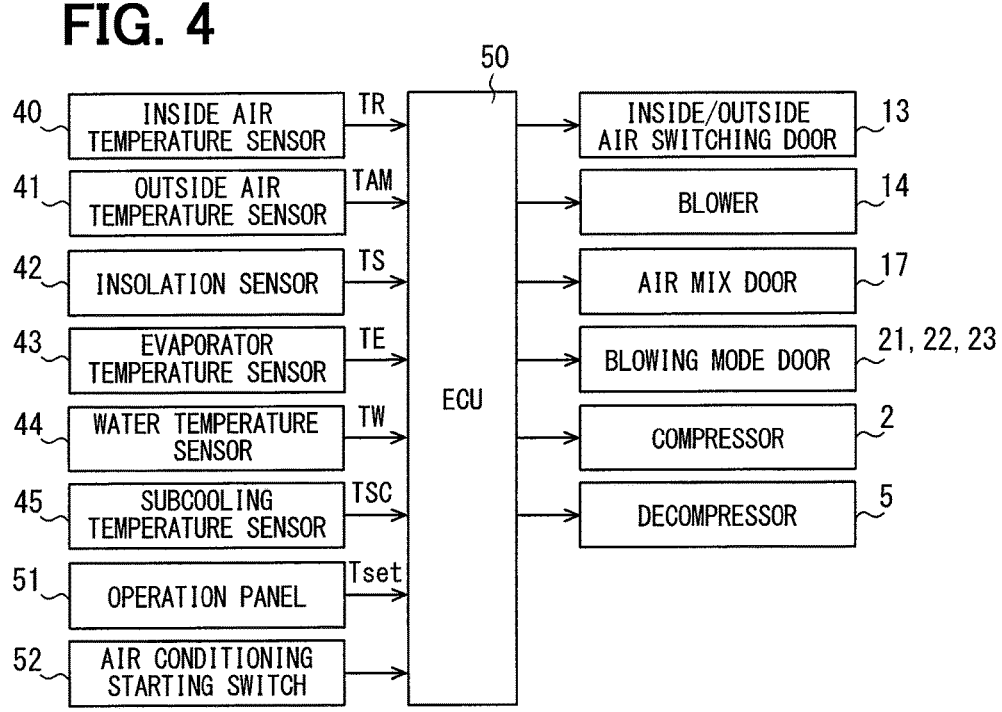
FIG. 4 is a block diagram illustrating a control system of the vehicle air conditioner according to the first embodiment.

As shown in FIG. 1, the vehicle air conditioner 100 has an air conditioning duct 10, a refrigeration cycle device 1, a cooling water circuit 31, a heater core 34, an air mix door device 17, blowing mode doors 21, 22, 23, an air conditioning electronic controller 50 (will be referred to as an air conditioning ECU 50) as a controller shown in FIG. 4, an inside/outside air switching door 13, and a blower 14.

The air conditioning duct 10 shown in FIG. 1 guides air (i.e., blown air) to be blown into the vehicle compartment and therein provides an air passage 10a that guides the air. The air conditioning duct 10 is provided adjacent to a front end of the vehicle compartment. An inside/outside air switching box 11 is provided at an upstream end of the air conditioning duct 10. The inside/outside air switching box 11 has an inside air inlet that introduces air (i.e., inside air) inside the vehicle compartment and an outside air inlet that introduces air (i.e., outside air) outside the vehicle compartment.

The inside air inlet and the outside air inlet of the inside/outside air switching box 11 is opened or closed by the inside/outside air switching door 13 operated by an actuator such as a servo motor. A suction mode of the vehicle air conditioner 100 is set to an inside air circulating mode or an outside air circulating mode by operating the inside/outside air switching door 13. The inside air or the outside air that is air flowing from the inside/outside air switching box 11 is introduced into the air passage 10a by the blower 14 as shown by arrow FLin.

The air conditioning duct 10 has a downstream end portion that configures an outlet switching box. The downstream end portion has a defroster opening, a face opening, and a foot opening. The defroster opening is connected with a defroster duct. The defroster duct has a downstream end provided with a defroster outlet 18 that mainly blows warm air toward an inner surface of a front windshield of the vehicle. The face opening is connected with a face duct. The face duct has a downstream end provided with a face outlet 19 that mainly blows cool air toward an upper body of a passenger. The foot opening is connected with a foot duct. The foot duct has a downstream end provided with a foot outlet 20 that mainly blows warm air toward foot of the passenger.

The outlets 18, 19, 20 are opened or closed by a defroster door 21, a face door 22, and a foot door 23, i.e., the blowing mode doors, respectively. The defroster door 21, the face door 22, and the foot door 23 are rotatably disposed inside the outlets 18, 19, 20 respectively. The blowing mode doors are operated by an actuator such as a servo motor and capable of setting a blowing mode to a face mode, a bi-level mode, a foot mode, a foot-defroster mode, or a defroster mode. The defroster door 21, the face door 22, and the foot door 23 are a blowing mode switching device.

The blower 14 is an electric blower causing an air flow in the air conditioning duct 10. An electric motor operates an impeller of the blower 14 to rotate, and a rotation speed of the electric motor is set depending on an applied voltage applied to the electric motor. The applied voltage applied to the electric motor is controlled based on a control signal from the air conditioning ECU 50 (refer to FIG. 4), and a volume (i.e., a blown volume) of air blown by the blower 14 is controlled by controlling the applied voltage.

As shown in FIG. 1, the refrigeration cycle device 1 has a compressor 2, a condenser 3, a subcooling heat exchanger 4 as an auxiliary heat exchanger, a decompressor 5, an evaporator 6, an interior heat exchanger 7 having a first heat exchanging portion 71 and a second heat exchanging portion 72, and a refrigerant pipe 9. The compressor 2, the condenser 3, the subcooling heat exchanger 4, the decompressor 5, the evaporator 6, and the interior heat exchanger 7 are connected in circle by the refrigerant pipe 9. That is, in a refrigerant circuit of the refrigeration cycle device 1 shown in FIG. 1, refrigerant discharged from the compressor 2 flows the compressor 2, the condenser 3, the subcooling heat exchanger 4, the first heat exchanging portion 71 of the interior heat exchanger 7, the decompressor 5, the evaporator 6, the second heat exchanging portion 72 of the interior heat exchanger 7, and the compressor 2, in this order. The subcooling heat exchanger is not limited to a heat exchanger that produces a smaller heat exchanging amount as compared with another heat exchanger. For example, a heat exchanging amount Qsc produced in the subcooling heat exchanger 4 may be greater than a heat exchanging amount produced in the condenser 3.

The compressor 2 has a refrigerant suction port 2a and a refrigerant discharge port 2b. The compressor 2 compresses refrigerant drawing from the refrigerant suction port 2a and discharges the refrigerant after being compressed from the refrigerant discharge port 2b. The compressor 2 is disposed in, for example, an engine room in the vehicle. The compressor 2 is connected to the engine 30 and is operated by a driving force from the engine 30. The compressor 2 has an electromagnetic clutch 2c that blocks or transmits the driving force from the engine 30. The air conditioning ECU 50 operates the electromagnetic clutch 2c to block or transmit the driving force.

The condenser 3 cools the refrigerant discharged by the compressor 2 by performing a heat exchange between the refrigerant and the outside air such that the refrigerant is condensed and liquefied. Specifically, the condenser 3 performs a heat exchange between the refrigerant discharged by the compressor 2 and both the outside air blown by an exterior fan and a traveling air, and causes the refrigerant to radiate heat by the heat exchange. The condenser 3 is, for example, disposed in a location such as a location adjacent to a front end of the engine room in the vehicle that can easily receive the traveling air caused when the vehicle is moving. That is, the condenser 3 is located outside the vehicle compartment. Accordingly, a temperature of air exchanging heat with the refrigerant in the condenser 3 is a temperature of the outside air.

The subcooling heat exchanger 4 causes a liquid refrigerant or a liquid-gas two phase refrigerant condensed in the condenser 3 to further radiate heat. Specifically, the subcooling heat exchanger 4 is disposed in the air conditioning duct 10 and located downstream of the evaporator 6 in a flow direction of air. The subcooling heat exchanger 4 causes the refrigerant flowing from the condenser 3 to further radiate heat by performing a heat exchange between the refrigerant and air to be blown into the vehicle compartment through the air conditioning duct 10. In other words, the subcooling heat exchanger 4 cools the refrigerant from the condenser 3 by performing a heat exchange between the refrigerant and air that is blown from the evaporator 6 after being cooled in the evaporator 6. Accordingly, a temperature of the air exchanging heat with the refrigerant in the subcooling heat exchanger 4 is a temperature of air blowing from the evaporator 6, and the temperature of the air blowing from the evaporator 6 is normally lower than a temperature of the outside air.

The refrigerant flowing out of the subcooling heat exchanger 4 flows into the decompressor 5 through the first heat exchanging portion 71 of the interior heat exchanger 7. The decompressor 5 is an expansion valve that causes refrigerant to flow to the evaporator 6 after decompressing and expanding the refrigerant.

The evaporator 6 is disposed in the air conditioning duct 10. The evaporator 6 evaporates and vaporizes refrigerant after being decompressed in the decompressor 5. Specifically, the evaporator 6 is located upstream of the subcooling heat exchanger 4 in the air conditioning duct 10 in the flow direction of air. Accordingly, the evaporator 6 performs a heat exchange between the refrigerant after being decompressed in the decompressor 5 and air before being heated by heat that is radiated from refrigerant in the subcooling heat exchanger 4. The evaporator 6 cools the air before being heated and evaporates the refrigerant by performing the heat exchange. The evaporator 6 subsequently causes the refrigerant after exchanging heat to flow to the refrigerant suction port 2a of the compressor 2 through the second heat exchanging portion 72 of the interior heat exchanger 72.

The interior heat exchanger 7 performs a heat exchange between refrigerant passing through the first heat exchanging portion 71 and refrigerant passing through the second heat exchanging portion 72. The first heat exchanging portion 71 is disposed in a refrigerant path between the condenser 3 and the decompressor 5, and is connected to the subcooling heat exchanger in series. Specifically, the first heat exchanging portion 71 is located between the subcooling heat exchanger 4 and the decompressor 5 in the refrigerant path between the condenser 3 and the decompressor 5. The second heat exchanging portion 72 is located in a refrigerant path between the evaporator 6 and the refrigerant suction port 2a of the compressor 2.

In a case that refrigerant circulates in the refrigerant circuit of the refrigeration cycle device 1, a temperature of refrigerant flowing in the first heat exchanging portion 71 of the interior heat exchanger 7 is higher than a temperature of refrigerant flowing in the second heat exchanging portion 72 of the interior heat exchanger 7. Accordingly, the refrigerant flowing in the first heat exchanging portion 71 as a high-temperature side heat exchanging portion is cooled, and the refrigerant flowing in the second heat exchanging portion 72 as a low-temperature side heat exchanging portion is heated.

Figure 2:
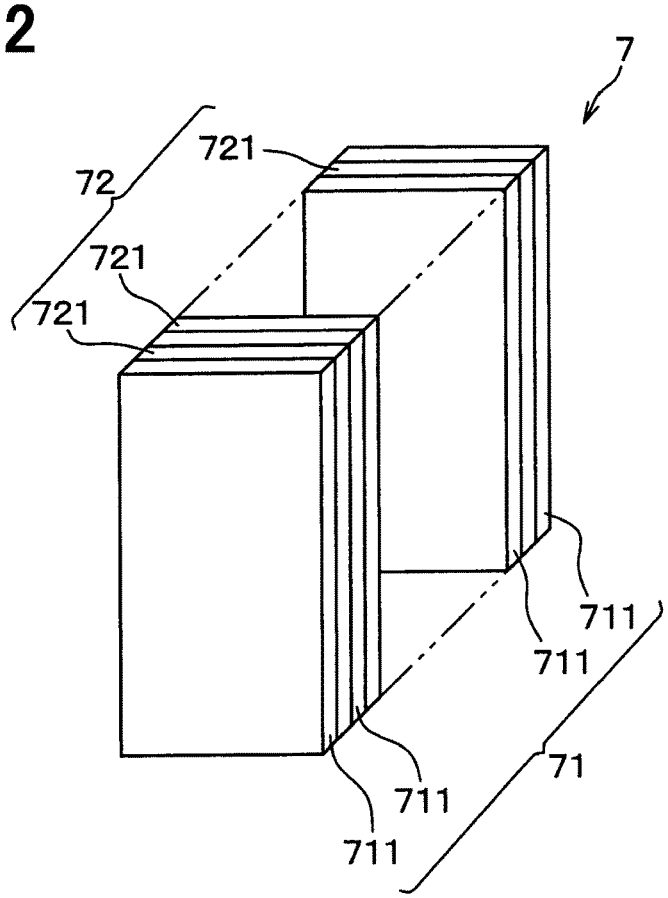
FIG. 2 is a perspective diagram illustrating a configuration of an interior heat exchanger shown in FIG. 1, according to the first embodiment.
Figure 3:
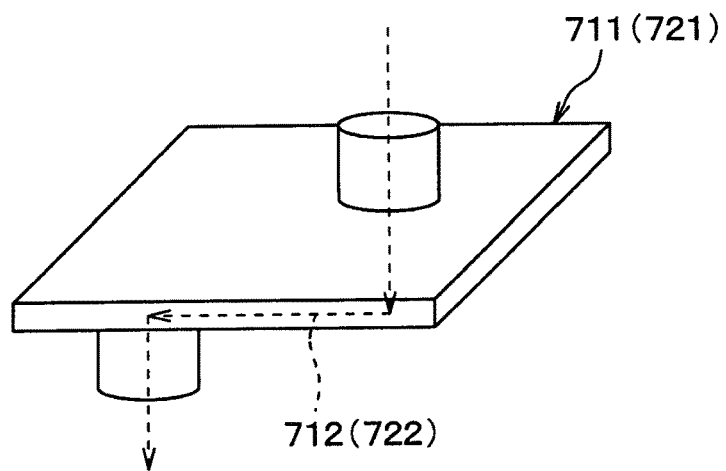
FIG. 3 is a perspective diagram illustrating a heat exchanging plate that configures the interior heat exchanger shown in FIG. 2.

A configuration of the interior heat exchanger 7 will be described referring to FIG. 2 and FIG. 3. FIG. 2 is a perspective diagram illustrating a configuration of the interior heat exchanger 7 schematically. FIG. 3 is a perspective diagram schematically illustrating a first heat exchanging plate 711 and a second heat exchanging plate 721 configuring the interior heat exchanger 7.

As shown in FIG. 2 and FIG. 3, the interior heat exchanger 7 is a so-called plate stacking type heat exchanger. The first heat exchanging portion 71 of the interior heat exchanger 7 has more than one of the first heat exchanging plate 711, as first stacked bodies, having a flat shape. The second heat exchanging portion 72 of the interior heat exchanger 7 has more than one of the second heat exchanging plate 712, as second stacked bodies, having a flat shape.

The first heat exchanging plate 711 therein has a first heat exchanging pathway 712 in which refrigerant flows. The second heat exchanging plate 712 therein has a second heat exchanging pathway 722 in which refrigerant flows.

Specifically, the first heat exchanging pathways 712 are connected parallel to each other, and the first heat exchanging plates 711 cause refrigerant flowing from the subcooling heat exchanger 4 to flow to the decompressor 5 after exchanging heat. The second heat exchanging pathways 722 are connected parallel to each other, and the second heat exchanging plates 721 cause refrigerant flowing from the evaporator 6 to flow to the refrigerant suction port 2a of the compressor 2 after exchanging heat. A dashed arrow in FIG. 3 shows a flow of refrigerant flowing in the first heat exchanging pathway 712 and the second heat exchanging pathway 722. In FIG. 3, each element included in the second heat exchanging portion 72 is shown in brackets.

As shown in FIG. 2, the interior heat exchanger 7 has the first heat exchanging plates 711 and the second heat exchanging plates 721 that are stacked alternately in a thickness direction of the first heat exchanging plates 711 and the second heat exchanging plates 721 and are joined to be one body. According to such an arrangement, refrigerant flowing in the first heat exchanging plate 711 and refrigerant flowing in the second heat exchanging plate 721 adjacent to the first heat exchanging plate 711 exchange heat with each other.

As shown in FIG. 1, the cooling water circuit 31 is a heat medium circuit connecting the engine 30 and the heater core 34 to each other. For example, a cooling water heated in a water jacket of the engine 30 circulates in the cooling water circuit 31 by a water pump (not shown). A radiator etc. (not shown) is disposed in the cooling water circuit 31 to be connected to the heater core 34 parallel to each other.

The cooling water that is a heat medium cooling the engine 30 by absorbing heat from the engine 30 flows in the heater core 34. The heater core 34 is disposed in a warm air passage 102. The heater core 34 is a heater that heats air flowing in the warm air passage 102 by performing a heat exchange between the cooling water after being heated in the engine 30 and the air. That is, the heater core 34 heats air, which flows in the air conditioning duct 10 after being cooled in the evaporator 6, using the cooling water as a heating heat source.

The evaporator 6 is located downstream of the blower 14 in the flow direction of air in the air passage 10a provided in the air conditioning duct 10. Specifically, the evaporator 6 is arranged across an entirety of the air passage 10a located immediately downstream of the blower 14. Accordingly, an entirety of air blown form the blower 14 flows through the evaporator 6. The evaporator 6 cools the air flowing in the air passage 10a by performing a heat exchange between the refrigerant after being decompressed in the decompressor 5 and the air. That is, the evaporator 6 is an interior heat exchanger that performs an air cooling operation and an air dehumidification operation. In the air cooling operation, the evaporator 6 cools the air by performing a heat exchange between refrigerant flowing in the evaporator 6 and air flowing in the air passage 10a. In the air dehumidification operation, the evaporator 6 dehumidifies the air passing through the evaporator 6.

The air passage 10a is divided into two passages at a branch portion 10c located downstream of the evaporator 6 in the flow direction of air. The air passage 10a is divided into a cool air bypass passage 101 as a first air passage and a warm air passage 102 as a second air passage in which air flows parallel to the cool air bypass passage 101, on a downstream side of the branch portion 10c in the flow direction of air.

That is, the air conditioning duct 10 therein provides the cool air bypass passage 101 and the warm air passage 102 in which air to be blown into the vehicle compartment flows. The evaporator 6 is disposed in the air conditioning duct 10 and located upstream of all of the cool air bypass passage 101, the warm air passage 102, the subcooling heat exchanger 4, and the heater core 34 in the flow direction of air. Arrow DR1 is a vertical direction DR1 of the air conditioning duct 10 mounted in the vehicle. The cool air bypass passage 101 is an upper air passage located above the warm air passage 102 in the vertical direction DR1, and the warm air passage 102 is a lower air passage.

The warm air passage 102 is an air passage that guides air flowing from the evaporator 6 to the subcooling heat exchanger 4 and the heater core 34. In the warm air passage 102, the subcooling heat exchanger 4 and the heater core 34 are stacked to be adjacent to each other in a flow direction of air flowing in the warm air passage 102. Specifically, the subcooling heat exchanger 4 is located upstream of the heater core 34 in the flow direction in the warm air passage 102, and each of the subcooling heat exchanger 4 and the heater core 34 is arranged across an entirety of the warm air passage 102. Accordingly, an entirety of air flowing in the warm air passage 102 passes through both the subcooling heat exchanger 4 and the heater core 34. The refrigerant in the subcooling heat exchanger 4 is cooled by air after being cooled in the evaporator 6, before the air is heated in the heater core 34.

The cool air bypass passage 101 is an air passage that guides air flowing from the evaporator 6 to bypass both the subcooling heat exchanger 4 and the heater core 34. The air mix door device 17 is located adjacent to the branch portion 10c in which the cool air bypass passage 101 and the warm air passage 102 separate from each other.

The air mix door device 17 is an air volume ratio adjuster that adjusts a ratio between a volume of air passing through the cool air bypass passage 101 and a volume of air passing through the warm air passage 102. The air mix door device 17 has a door body and distributes air on a downstream side of the evaporator 6 in the air conditioning duct 10 by displacing the door body using an actuator etc., and thereby adjusts a temperature of air to be blown into the vehicle compartment.

Specifically, the air mix door device 17 has a first door 171 and a second door 172 attached to the air conditioning duct 10. The first door 171 is an opening/closing device opening or closing the cool air bypass passage 101 and adjusts an opening degree of an upstream end opening of the cool air bypass passage 101. The second door 172 is an opening/closing device opening or closing the warm air bypass passage 102 and adjusts an opening degree of an upstream end opening of the warm air passage 102. The first door 171 and the second door 172 are a rotary door.

For example, the first door 171 decreases the opening degree of the cool air bypass passage 101, and the second door 171 decreases the opening degree of the warm air passage 102, to increase a ratio of the volume of air passing through the warm air passage 102 with respect to the volume of air passing through the cool air bypass passage 101.

The second door 172 adjusts the opening degree of the warm air passage 102, and thereby adjusts a volume of air passing through the subcooling heat exchanger 4. Specifically, the volume of air passing through the subcooling heat exchanger 4 increases as the opening degree of the warm air passage 102 increases. A heat radiation amount radiated from the refrigerant in the subcooling heat exchanger 4 increases as the volume of air passing through the subcooling heat exchanger 4 increases. Accordingly, the second door 172 functions as a heat radiation amount adjuster that changes the heat radiation amount radiated from the refrigerant in the subcooling heat exchanger 4.

Specifically, the heat radiation amount radiated from the refrigerant in the subcooling heat exchanger 4 is increased or decreased in a manner that the second door 172 as the heat radiation amount adjuster opens or closes the warm air passage 102. For example, a flow of air passing through the subcooling heat exchanger 4 is substantially stopped when the second door 172 closes the warm air passage 102. That is, the second door 172 decreases the heat radiation amount from the refrigerant in the subcooling heat exchanger 4 by decreasing a volume of air passing through the subcooling heat exchanger 4 on a condition that the warm air passage 102 is closed, as compared to a condition that the warm air passage 102 is open. According to the present embodiment, the first door 171 is controlled to open such that cool air is blown mainly from the face outlet 19, e.g., when a large volume of the cool air is required to be blown into the vehicle compartment.

The air mix door device 17 as a whole moves between a maximum cooling performance position (i.e., a MAXCOOL position) and a maximum heating performance position (i.e., a MAXHOT position). The first door 171 fully opens the cool air bypass passage 101, and the second door 172 fully closes the warm air passage 102, when the air mix door device 17 is located at the MAXCOOL position. The first door 171 fully closes the cool air bypass passage 101, and the second door 172 fully opens the warm air passage 102, when the air mix door device 17 is located at the MAXHOT position.

For example, the air mix door device 17 is located at the MAXCOOL position when the vehicle air conditioner 100 is operated in a maximum cooling performance (i.e., in a MAXCOOL) and is located at the MXHOT position when the vehicle air conditioner 100 is operated in a maximum heating performance (i.e., in a MAXHOT). In FIG. 1, the first door 171 and the second door 172 located at the MAXHOT position is illustrated by a solid line, and the first door 171 and the second door 172 located at the MAXCOOL position is illustrated by a dashed line.

A cool air/warm air mixing space 10d (i.e., a mixing space) is provided downstream of the cool air bypass passage 101 and the warm air passage 102. Cool air from the cool air bypass passage 101 and warm air from the warm air passage 102 are mixed in the mixing space. The above-described defroster opening, the face opening, and the foot opening are provided to approach the cool air/warm air mixing space 10d, and air flowing from the cool air/warm air mixing space 10d can flow into the openings.

A configuration of a control system according to the present embodiment will be described referring to FIG. 4. FIG. 4 is a block diagram illustrating the control system of the vehicle air conditioner 100 according to the present embodiment. Switching signals from various switches such as a temperature setting switch provided in an operation panel 51 and sensor signals from various sensors are input to the air conditioning ECU 50.

An air conditioning starting switch 52 is provided with the operation panel 51 in a front surface inside the vehicle compartment. The air conditioning starting switch 52 is an air conditioning switch that is operated by a passenger to switch an air conditioning operation between an operating condition (i.e., ON) and a non-operating condition (i.e., OFF). The air conditioning starting switch 52 is set to any one of two operation positions of an air conditioning ON position that starts the air conditioning operation and an air conditioning OFF position that stops the air conditioning operation. A signal regarding the operation positions of the air conditioning starting switch 52 is also input to the air conditioning ECU 50. The air conditioning operation is, e.g., a cooling operation or a dehumidification operation and is, i.e., at least an air conditioning operation in which air is cooled in the evaporator 6.

The above-described various sensors are, for example, an inside air temperature sensor 40, an outside air temperature sensor 41, an insolation sensor 42, an evaporator temperature sensor 43, a water temperature sensor 44, and a subcooling temperature sensor 45 shown in FIG. 4. The inside air temperature sensor 40 detects an air temperature TR (that may be referred to as an inside air temperature TR) inside the vehicle compartment. The outside air temperature sensor 41 detects an air temperature TAM (that may be referred to as an outside air temperature TAM) outside the vehicle compartment. The insolation sensor 42 detects an insolation amount TS radiated into the vehicle compartment. The evaporator temperature sensor 43 detects, as a temperature of the evaporator 6, a temperature of an outer surface of the evaporator 6 or the air temperature TE of air cooled in the evaporator 6. The water temperature sensor 44 detects a temperature (i.e., a cooling water temperature TW) of the cooling water flowing into the heater core 34. The subcooling temperature sensor 45 detects a temperature of an outer surface of the subcooling heat exchanger 4 or an air temperature TSC of air heated in the subcooling heat exchanger 4.

The air conditioning ECU 50 includes a microcomputer having CPU, ROM, and RAM (not shown). Sensor signals from the sensors 40-45 are input to the microcomputer after being A/D converted by an input circuit (not shown) in the air conditioning ECU 50. For example, the air conditioning ECU 50 is operated when an ignition switch of the vehicle is turned on.

The air conditioning ECU 50 is a controller controlling the vehicle air conditioner 100 and controls an operation of a target device by performing the following procedure based on input signals from the various switches provided in the operation panel 51, input signals from the sensors 40-45, etc. The target device is, for example, the inside/outside air switching door 13, the blower 14, the air mix door device 17, the blowing mode doors 21, 22, 23, the compressor 2, or the decompressor 5. The air conditioning ECU 50 does not control the decompressor 5 in a case that the decompressor 5 is an expansion valve device sensing a temperature of the refrigerant.

Figure 5:
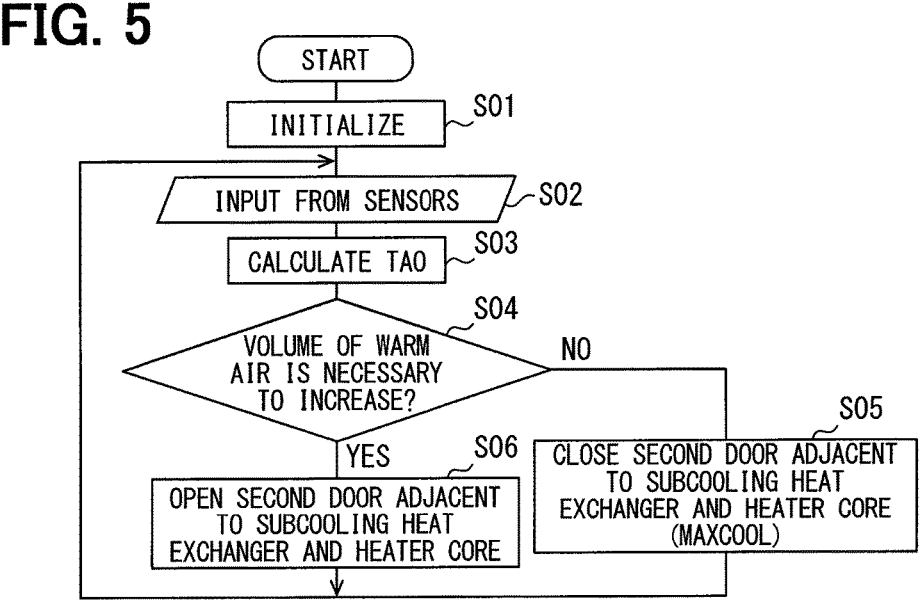
FIG. 5 is a flow chart illustrating a control processing performed by an air conditioning ECU for an opening/closing control of a second door, according to the first embodiment.

The air conditioning ECU 50 functions as an air conditioning controller performing various air conditioning controls, and exerts a control processing shown in a flow chart in FIG. 5. FIG. 5 is a flow chart illustrating a control processing to perform an opening/closing control for the second door 172.

The air conditioning ECU 50 periodically repeats the control processing shown in the flow chart in FIG. 5, e.g., when the air conditioning starting switch 52 is on.

As shown in FIG. 5, the air conditioning ECU 50 initializes various settings at S01. Subsequently, the air conditioning EUC 50 reads switching signals from the various switches provided in the operation panel 51 and sensor signals from the sensors 40-45 etc. The control processing advances from S02 to S03.

At S03, the air conditioning ECU 50 calculates a target blowing temperature TAO, which is a target temperature of air to be blown into the vehicle compartment, using an arithmetic expression memorized in advance. The target blowing temperature TAO is calculated based on, e.g., the inside air temperature TR, the outside air temperature TAM, the insolation amount TS, and a set temperature Tset of air inside the vehicle compartment.

The control processing advances to S04 after the target blowing temperature TAO is calculated at S03. At S04, the air conditioning ECU 50 determines whether a volume of warm air heated in the warm air passage 102 is required to be increased as compared to an air conditioning state when the air mix door device 17 is located at the MAXCOOL position, such that a temperature of air to be blown into the vehicle compartment becomes the target blowing temperature TAO. That is, at S04, the air conditioning ECU 50 determines whether the second door 172 is required to be open. For example, the air conditioning ECU 50 compares the target blowing temperature TAO and the air temperature TE detected by the evaporator temperature sensor 43, and determines that the volume of warm air is necessary to be increased when the target blowing temperature TAO is higher than the air temperature TE (TAO>TE).

The control processing advances to S06 when the volume of warm air is determined to be necessary to increase at S04. On the other hand, the control processing advances to S05 when the volume of warm air is determined not to be necessary to increase.

At S05, the air conditioning ECU 50 operates the air mix door device 17 to be located at the MAXCOOL position. That is, the first door 171 fully opens the cool air bypass passage 101, and the second door 172 fully closes the warm air passage 102. In this case, cool air, which is air flowing from the evaporator 6, does not flow into the warm air passage 102 and is not heated in the subcooling heat exchanger 4 and the heater core 34. Accordingly, the subcooling heat exchanger 4 causes the refrigerant in the subcooling heat exchanger 4 to flow out of the subcooling heat exchanger 4 without exchanging heat with air. The control processing returns to S02 after S05.

At S06, the air conditioning ECU 50 operates the second door 172 to open the warm air passage 102 such that air flowing from the evaporator 6 flows into the warm air passage 102. Accordingly, a re-heat operation, in which air cooled in the evaporator 6 is blown into the vehicle compartment after being heated, is performed. In the re-heat operation, the heat is heated by both of the subcooling heat exchanger 4 and the heater core 34. The re-heat operation includes a MAXHOT operation in which the air mix door device 17 is located at the MAXHOT position. In the MAXHOT operation, for example, the air flowing from the evaporator 6 flows into the warm air passage 102 and is blown into the vehicle compartment after being heated in the subcooling heat exchanger 4 and the heater core 34. The re-heat operation is an example of the air conditioning operation.

At S06, the air conditioning ECU 50 also adjusts the opening degree of the warm air passage 102, and adjusts the opening degree of the cool air bypass passage 101 by moving the first door 171 between a fully opening position and a fully closing position. for example, the opening degree of the cool air bypass passage 101 and the opening degree of the warm air passage 102 are adjusted by moving the first door 171 and the second door 172 based on an input information from the evaporator temperature sensor 43, the water temperature sensor 44, and the subcooling temperature sensor 45, such that a temperature of air mixed in the cool air/warm air mixing space 10$d$ approaches the target blowing temperature TAO. The control processing returns to S02 after S06.

When the air conditioning operation is performed in the control processing shown in FIG. 5, the air conditioning ECU 50 determines a volume of air blown by the blower 14 corresponding to the target blowing temperature TAO etc., an on/off switching state of the compressor 2, a suction mode regarding the inside air and the outside air, and the blowing mode based on a characteristic diagram (i.e., a map) memorized in ROM in advance, although it is not shown in the drawings.

The air conditioning ECU 50 sets a set mode, which is set manually, when the volume of air blown by the blower, the suction mode, and the blowing mode are set manually using the operation panel 51. The air conditioning ECU 50 outputs control signals to the inside/outside air switching door 13, the blower 14, the air mix door device 17, the blowing mode doors 21, 22, 23, and the compressor 2 to perform various control state that is calculated or determined while the control processing shown in FIG. 5 is performed.

Each section in the control processing shown in FIG. 5 configures each element exerting a function of the each section.

As described above, according to the present embodiment, the refrigeration cycle device 1 has the subcooling heat exchanger 4 that performs a heat exchange between refrigerant flowing from the condenser 3 and air and causes the refrigerant to radiate heat, and further has the interior heat exchanger 7 that performs a heat exchange between refrigerant flowing in the first heat exchanging portion 71 and refrigerant flowing in the second heat exchanging portion 72. The first heat exchanging portion 71 of the interior heat exchanger 7 is arranged in the refrigerant path between the condenser 3 and the decompressor 5 and connected to the subcooling heat exchanger 4 in series. On the other hand, the second heat exchanging portion 72 of the interior heat exchanger 7 is arranged in the refrigerant path between the evaporator 6 and the compressor 2. Accordingly, an enthalpy difference between an inlet and an outlet of the evaporator 6 can be increased by a heat exchange between refrigerants performed in the interior heat exchanger 7 even when the air conditioning operation is performed in a usage scene in which a heat radiation from refrigerant in the subcooling heat exchanger 4 is restricted. The usage scene is, for example, a scene performing the MAXCOOL in which the second door 172 is fully closed. As a result, a power saving effect can be obtained by increasing the enthalpy difference.

In addition, the heat exchange in the subcooling heat exchanger 4 is restricted since the second door 172 closes the warm air passage in the MAXCOOL as described above. On the other hand, a temperature difference between a temperature of refrigerant flowing in the first heat exchanging portion 71 of the interior heat exchanger 7 and a temperature of refrigerant flowing in the second heat exchanging portion 72 of the interior heat exchanger 7 becomes largest in the MAXCOOL. That is, the heat exchange between the refrigerants in the interior heat exchanger 7 is promoted greatly in the MAXCOOL in which the heat exchange in the subcooling heat exchanger 4 is restricted, and is promoted less greatly in the MAXHOT in which the heat exchange in the subcooling heat exchanger 4 is promoted. Therefore, the subcooling heat exchanger 4 and the interior heat exchanger 7 are in a complementary relationship when increasing the enthalpy difference between the inlet and the outlet of the evaporator 6, and a combination of the subcooling heat exchanger 4 and the interior heat exchanger 7 is appropriate to obtain the power saving effect.

Figure 6:
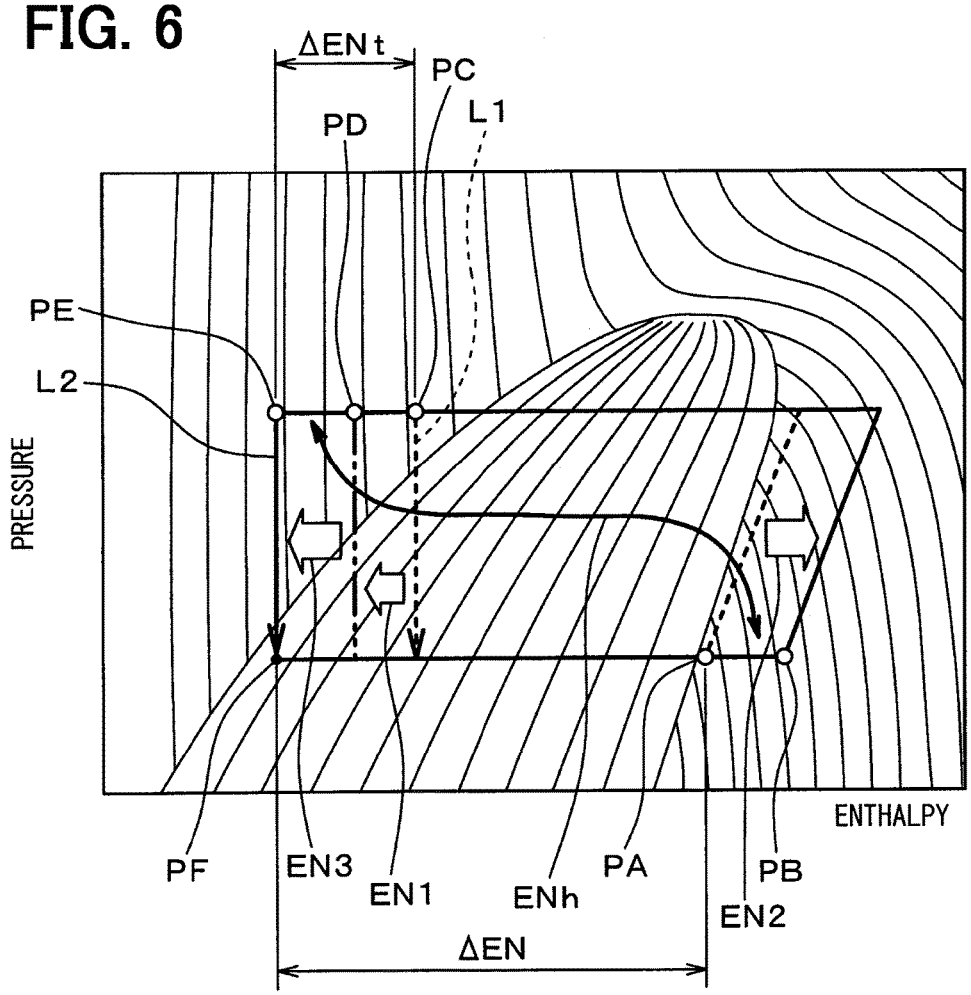
FIG. 6 is an enthalpy diagram illustrating an example of a state of refrigerant circulating in a refrigeration cycle device according to the first embodiment.

A state variation of refrigerant circulating in the refrigeration cycle device 1 and a temperature variation of air flowing in the air conditioning duct 10 will be described referring to FIG. 6 through FIG. 9. FIG. 6 is a pressure-enthalpy diagram illustrating an example of a state of refrigerant circulating in the refrigeration cycle device 1.

According to the example of the state of refrigerant in the refrigeration cycle device 1 shown in FIG. 6, a gas-phase refrigerant having a high temperature and a high pressure is discharged from the compressor 2 and condensed in the condenser 3, and refrigerant flowing from the condenser 3 is in a state shown by a point PC. As premises for that, refrigerant flowing out of the subcooling heat exchanger 4 is in a state shown by a point PD when air flows through the subcooling heat exchanger 4 such that the subcooling heat exchanger 4 is capable of performing the heat exchange, i.e., the second door 172 (refer to FIG. 1) opens the warm air passage 102. That is, the subcooling heat exchanger 4 performs a heat exchange between refrigerant flowing from the condenser 3 and air (i.e., air from the evaporator) cooled in the evaporator 6 and flowing out of the evaporator 6, and an enthalpy of the refrigerant decreases as shown by an arrow EN1 before the refrigerant is decompressed in the decompressor 5.

Refrigerant flowing out of the first heat exchanging portion 71 is in a state shown by a point PE by the heat exchange between the refrigerants in the interior heat exchanger 7, since the first heat exchanging portion 71 of the interior heat exchanger 7 is disposed in the refrigerant path between the subcooling heat exchanger 4 and the decompressor 5. Refrigerant flowing out of the second heat exchanging portion 72 of the interior heat exchanger 7 is in a state shown by a point PB when refrigerant flowing out of the evaporator 6 is estimated to be in a state shown by a point PA, and the refrigerant in the state shown by the point PB is drawn into the compressor 2.

That is, refrigerant in a refrigerant outlet of the subcooling heat exchanger 4 and refrigerant in the outlet of the evaporator 6 exchanges heat in the interior heat exchanger 7 as shown by an arrow ENh, and thereby an enthalpy of refrigerant flowing out of the subcooling heat exchanger 4 decreases as shown by an arrow EN3 before the refrigerant is decompressed in the decompressor 5. An enthalpy of refrigerant before being drawn into the compressor 2 increases as shown by an arrow EN2.

As a result, an enthalpy difference ΔEN between refrigerant flowing into the evaporator 6 and refrigerant flowing out of the evaporator 6, specifically the enthalpy difference ΔEN between a point PF and the point PA shown in FIG. 6, is secured to be large, and therefore a cooling performance and an operation efficiency COP of the refrigeration cycle device can be improved greatly. That is, the power saving effect can be obtained by the subcooling heat exchanger 4 and the interior heat exchanger 7. For example, in an operation range of the vehicle air conditioner 100 between the MAXCOOL and the MAXHOT, the enthalpy difference between the point PC and the point PD caused by the heat exchange performed by the subcooling heat exchanger 4 decreases while the enthalpy difference between the point PD and the point PE caused by the heat exchange performed by the interior heat exchanger 7 increases, as an operation state of the vehicle air conditioner 100 approaches the MAXCOOL. Accordingly, as described above, the subcooling heat exchanger 4 and the interior heat exchanger 7 are complementary when increasing the enthalpy difference ΔEN between the refrigerants in the evaporator 6, and the combination of the subcooling heat exchanger 4 and the interior heat exchanger 7 is appropriate to obtain the power saving effect.

For example, a cycle shown by a dashed line L1 in FIG. 6 is a comparable example showing a conventional configuration that does not have the subcooling heat exchanger 4 and the interior heat exchanger 7. According to the present embodiment, a portion of the comparable example shown by the dashed line L1 is shifted to a portion shown by a solid line L2 due to heat exchanges performed by the subcooling heat exchanger 4 and the interior heat exchanger 7.

Figure 7:
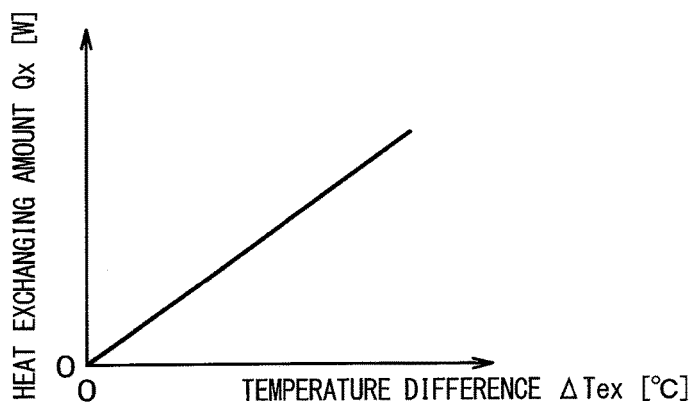
FIG. 7 is a graph showing a relationship between a heat exchanging amount in the interior heat exchanger and a temperature difference between a temperature of refrigerant flowing out of a subcooling heat exchanger and a temperature of refrigerant flowing out of an evaporator, according to the first embodiment.
Figure 8:
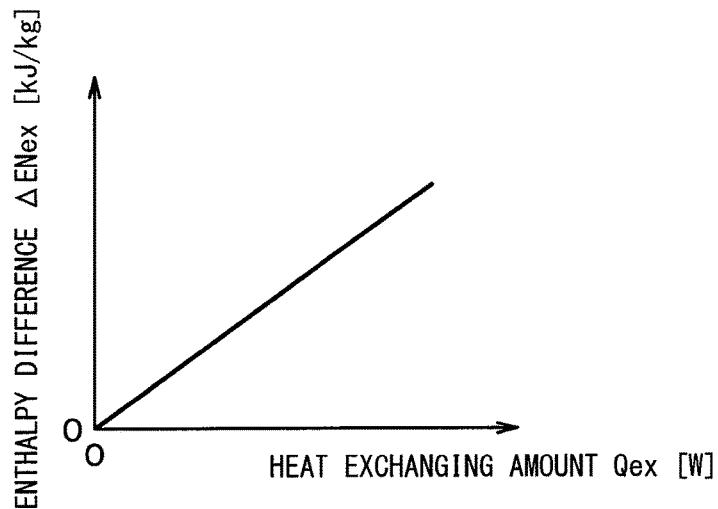
FIG. 8 is a graph showing a relationship between the heat exchanging amount in the interior heat exchanger and an enthalpy difference between point PD and point PE shown in FIG. 6.

The interior heat exchanger 7 is a device that performs the heat exchange between refrigerant flowing out of the subcooling heat exchanger 4 and refrigerant flowing out of the evaporator 6 as shown by the arrow ENh and increases the enthalpy difference between the point PD and the point PE. Accordingly, as shown in FIG. 7, a heat exchanging amount Qex in the interior heat exchanger 7 increases as a temperature difference ΔTex between the refrigerant flowing out of the subcooling heat exchanger 4 and the refrigerant flowing out of the evaporator 6 increases. In addition, as shown in FIG. 8, an enthalpy difference ΔENex caused in the refrigerant by the interior heat exchanger 7, i.e., the enthalpy difference between the point PD and the point PE shown in FIG. 6, increases as the heat exchanging amount Qex in the interior heat exchanger 7 increases. That is, a heat exchanging performance of the interior heat exchanger 7 is improved as the temperature difference ΔTex of the refrigerant shown in FIG. 7 increases, and thereby the enthalpy difference ΔENex of the refrigerant shown in FIG. 8 is increased.

When considering the power saving effect obtained by the subcooling heat exchanger 4 according to the present embodiment, the subcooling heat exchanger 4 can cause a temperature of refrigerant flowing into the decompressor 5 to be lower than the outside temperature TAM depending on a temperature of cool air flowing from the evaporator 6. Accordingly, an enthalpy given to the refrigerant in the evaporator 6 is increased. As a result, an efficiency of the refrigeration cycle device 1 can be improved greatly.

Figure 9:
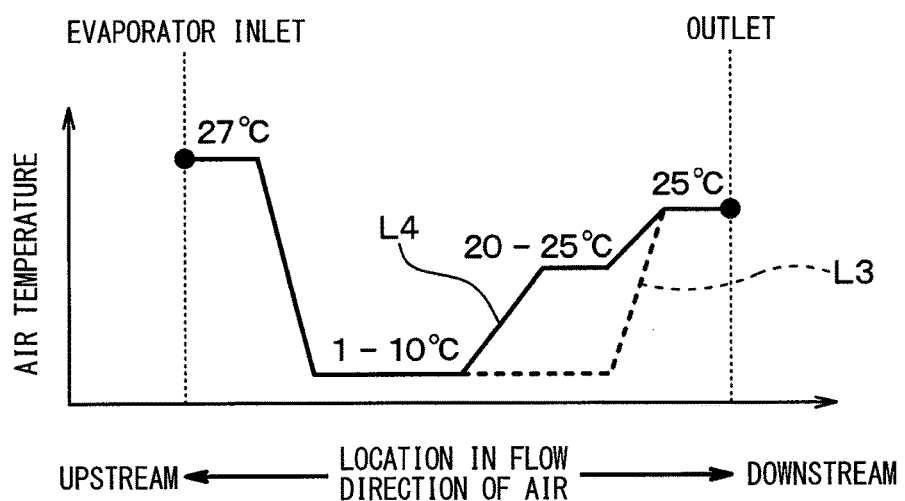
FIG. 9 is a graph showing an example of a variation of an air temperature in an air conditioning duct in a re-heating operation performed by the vehicle air conditioner according to the first embodiment.

FIG. 9 is a graph illustrating an example of a temperature variation of air in the air conditioning duct 10 during the re-heat operation of the vehicle air conditioner 100. As shown in FIG. 9, a temperature of air introduced into the air conditioning duct 10 falls since the air is cooled by a heat exchange between the air and refrigerant performed in the evaporator 6. At this time, water included in the air is condensed by decreasing the temperature of air below a dew point, and thereby an absolute humidity of the air falls. A passenger inside the vehicle compartment can be kept to feel comfortable feeling by blowing air into the vehicle compartment after heating the dehumidified air to have an appropriate blowing temperature by the heater core 34. According to the present embodiment, air flowing in the warm air passage 102 is heated in the subcooling heat exchanger 4, in which refrigerant from the condenser 3 flows, and is further heated in the heater core 34 subsequently, when the second door 172 (refer to FIG. 1) is fully open.

A vehicle air conditioner having no subcooling heat exchanger 4 heats air by the heater core 34 only using exhaust heat from an engine. In contrast, the vehicle air conditioner 100 of the present embodiment partially heats air using heat of refrigerant before being decompressed, and thereby decreases an enthalpy of refrigerant, immediately before flowing into the evaporator 6, while providing the comfortable feeling in the vehicle compartment.

As shown in FIG. 9, the vehicle air conditioner according to the above-described comparable example having no subcooling heat exchanger 4 heats the air by the heater core 34 only as shown by a dashed line L3, and thereby the blowing temperature rises to the target blowing temperature TAO. On the other hand, the vehicle air conditioner 100 according to the present embodiment further heats air, after being heated in the subcooling heat exchanger 4, in the heater core 34 as shown by a solid line L4, and thereby the blowing temperature rises to the target blowing temperature TAO.

Furthermore, according to the present embodiment, the subcooling heat exchanger 4 is disposed in the air conditioning duct 10 as shown in FIG. 1 to be located downstream of the evaporator 6 in the flow direction of air blowing into the vehicle compartment, and a temperature of air from the evaporator is normally lower than the outside air temperature TAM. As a result, a heat exchange between the air, of which temperature is lower than the outside air temperature TAM, and refrigerant flowing in the subcooling heat exchanger 4 is performed, and thereby the refrigerant can be cooled.

Moreover, according to the present embodiment, a heat radiation amount radiated from refrigerant in the subcooling heat exchanger 4 is increased or reduced in a manner that the second door 172 disposed in the air conditioning duct 10 opens or closes the warm air passage 102 provided in the air conditioning duct 10. The heat radiation amount is reduced when the second door 172 closes the warm air passage 102 as compared to a heat radiation amount when the second door 172 opens the warm air passage 102. Accordingly, the heat radiation amount radiated from refrigerant in the subcooling heat exchanger 4 can be adjusted depending on a degree of a heating requirement for heating air flowing in the air conditioning duct 10.

According to the present embodiment, the first heat exchanging portion 71 of the interior heat exchanger 7 has the first heat exchanging plates 711 that have a flat shape and provide the first heat exchanging pathway 712 in which refrigerant flows. The second heat exchanging portion 72 of the interior heat exchanger 7 has the second heat exchanging plates 721 that have a flat shape and provide the second heat exchanging pathway 722 in which refrigerant flows. The first heat exchanging plates 711 and the second heat exchanging plates 721 are stacked alternately. Accordingly, a size of the interior heat exchanger 7 can be small easily with respect to a heat exchanging performance of the interior heat exchanger 7, and thereby a mounting location in which the interior heat exchanger 7 is disposed can be flexible.

According to the present embodiment, the second door 172 closes the warm air passage 102 such that a heat radiation from the subcooling heat exchanger 4 and the heater core 34 is restricted, when air cooled in the evaporator 6 is blown into the vehicle compartment without being heated. As a result, the air cooled in the evaporator 6 can be prevented from being heated unnecessarily when the air is blown into the vehicle compartment without being heated.

In addition, according to a cycle configuration using the combination of the subcooling heat exchanger 4 and the interior heat exchanger 7, the first heat exchanging portion 71 of the interior heat exchanger 7 and the subcooling heat exchanger 4 may be connected to each other in parallel. However, according to the present embodiment, the first heat exchanging portion 71 and the subcooling heat exchanger 4 are connected to each other in series. As a result, a switching valve etc. for switching refrigerant paths is not necessary, and thereby a configuration of a refrigeration cycle can be simplified.

Second Embodiment

A second embodiment will be described hereafter. In the present embodiment, a part that is different from the above-described first embodiment is mainly described, and a description of a part that corresponds to or equivalents to a matter described in the first embodiment may be omitted or simplified. That is the same in a third embodiment and another embodiment described later.

Figure 10:
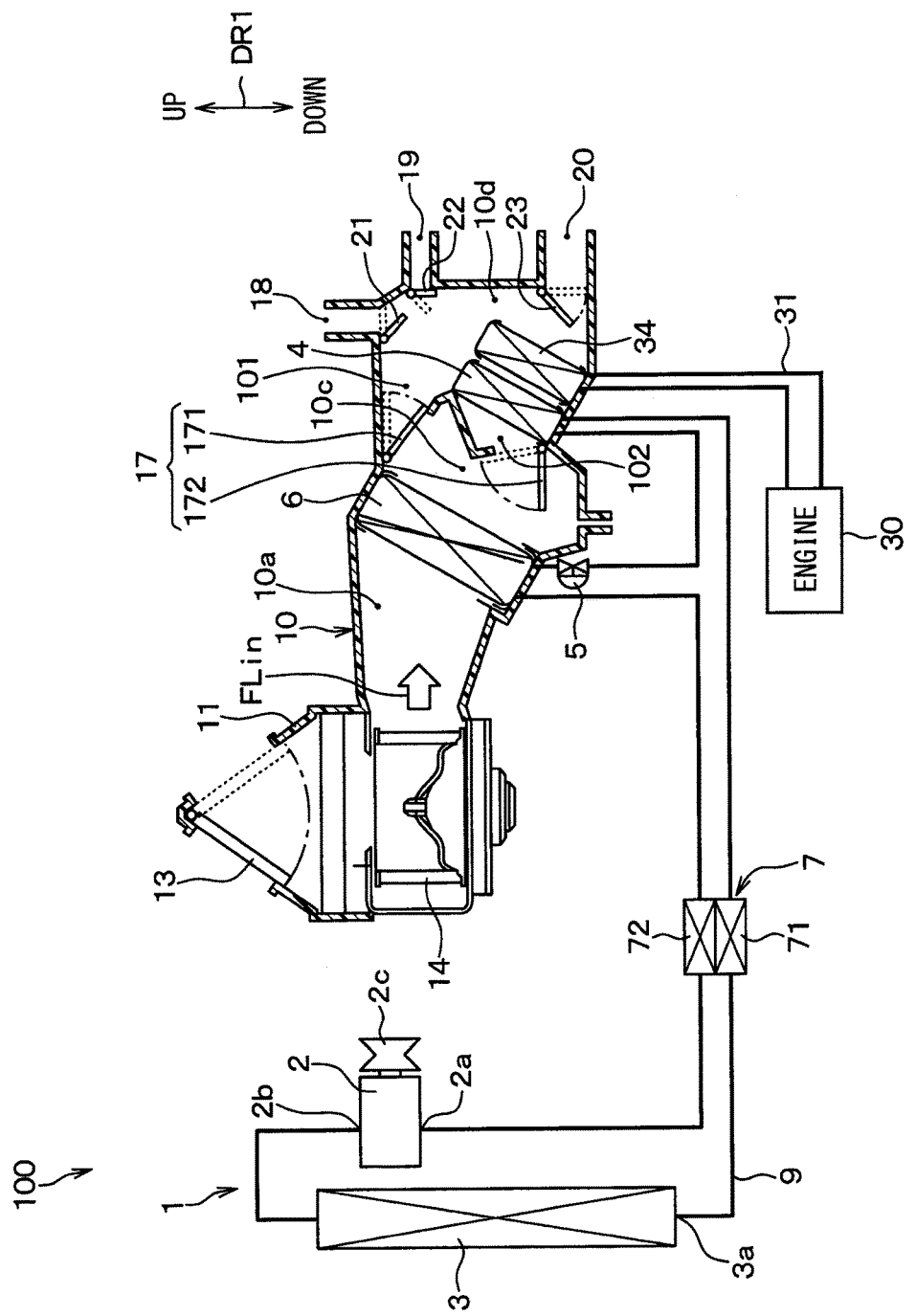
FIG. 10 is a schematic diagram illustrating a schematic configuration of a vehicle air conditioner according to a second embodiment and corresponds to FIG. 1 of the first embodiment.

FIG. 10 is a diagram corresponding to FIG. 1 and is a schematic diagram illustrating a schematic configuration of the vehicle air conditioner 100 according to the present embodiment. As shown in FIG. 10, according to the present embodiment, a location of the interior heat exchanger 7 is different from that of the first embodiment. Specifically, the first heat exchanging portion 71 of the interior heat exchanger 7 is disposed in the refrigerant path between the condenser 3 and the decompressor 5 and is located between the condenser 3 and the subcooling heat exchanger 4. On the other hand, the second heat exchanging portion 72 is disposed in the refrigerant path between the evaporator 6 and the refrigerant suction port 2a of the compressor 2 similar to the first embodiment. Accordingly, in a refrigeration cycle of the refrigeration cycle device 1 shown in FIG. 10, refrigerant discharged by the compressor 2 flows in order of the condenser 3, the first heat exchanging portion 71 of the interior heat exchanger 7, the subcooling heat exchanger 4, the decompressor 5, the evaporator 6, the second heat exchanging portion 72 of the interior heat exchanger 7, and the compressor 2. The interior heat exchanger 7 performs a heat exchange between refrigerant in the refrigerant outlet of the condenser 3 and refrigerant in the outlet of the evaporator 6.

Figure 11:
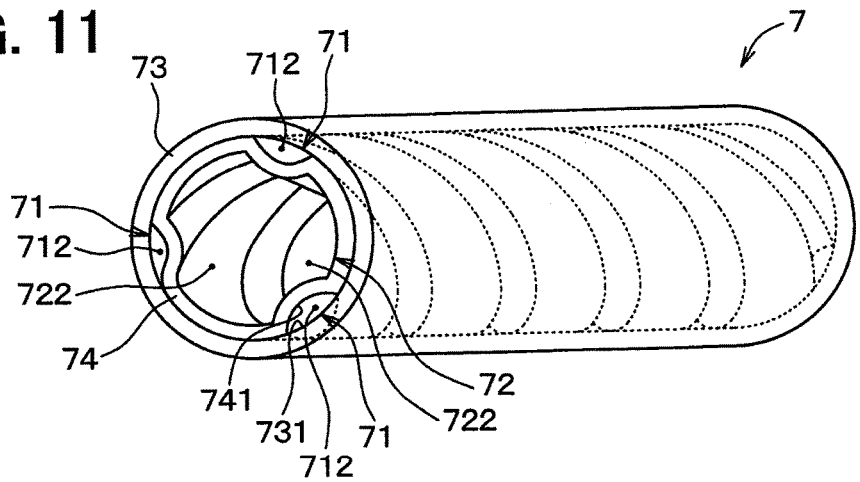
FIG. 11 is a perspective diagram illustrating a part of an interior heat exchanger according to the second embodiment.

FIG. 11 is a perspective diagram illustrating a part of the interior heat exchanger 7 of the present embodiment. As shown in FIG. 11, the interior heat exchanger 7 according to the present embodiment is different from that of the first embodiment in a point of being a piping-type interior heat exchanger having a double-pipe configuration. The interior heat exchanger 7 has an outer pipe 73 having a tubular shape and an inner pipe 74 having a tubular shape and being inserted to the outer pipe 73 to fit with each other. The inner pipe 74 has an outer surface that is provided with an outer groove 741 extending helically. The outer groove 741 and an inner surface 731 of the outer pipe 73 provide a helical pathway as the first heat exchanging pathway 712. Refrigerant from the condenser 3 flows in the first heat exchanging pathway 712 and flows to the subcooling heat exchanger 4 after flowing out of the first heat exchanging pathway 712. The outer pipe 73 and the inner pipe 74 have a portion providing the first heat exchanging pathway 712, and the portion corresponds to the first heat exchanging portion 71.

The inner pipe 74 therein provides the second heat exchanging pathway 722. Refrigerant from the evaporator 6 flows into the second heat exchanging pathway 722 and flows to the refrigerant suction port 2a of the compressor 2 after flowing out of the second heat exchanging pathway 722. The inner pipe 74 has a portion providing the second heat exchanging pathway 722, and the portion corresponds to the second heat exchanging portion 72. In the interior heat exchanger 7 shown in FIG. 11, a flow direction of refrigerant flowing in the second heat exchanging pathway 722 is opposite to a flow direction of refrigerant flowing in the first heat exchanging pathway 712. The interior heat exchanger 7 according to the present embodiment is located outside the vehicle compartment, e.g., in an engine room, however the interior heat exchanger 7 may be disposed in any location in the vehicle.

The present embodiment can provide the same effects as the first embodiment obtained by a common configuration that is common between the present embodiment and the above-described first embodiment.

Furthermore, according to the present embodiment, the first heat exchanging portion 71 of the interior heat exchanger 7 is disposed in the refrigerant path between the condenser 3 and the subcooling heat exchanger 4, and the second heat exchanging portion 72 is disposed in the refrigerant path between the evaporator 6 and the refrigerant suction port 2a of the compressor 2. That is, both the first heat exchanging portion 71 and the second heat exchanging portion 72 of the interior heat exchanger 7 are not disposed in a refrigeration path between the subcooling heat exchanger 4 and the evaporator 6 housed in the air conditioning duct 10. Therefore, there is an advantage that a location of the interior heat exchanger 7 is hardly restricted by an arrangement of the air conditioning duct 10 according to the present embodiment.

The second embodiment is different from the above-described first embodiment in location of the first heat exchanging portion 71 of the interior heat exchanger 7. An influence on the power saving effect of the refrigeration cycle device 1 due to the locational difference will be described hereafter.

According to the second embodiment, as shown in FIG. 10, the first heat exchanging portion 71 of the interior heat exchanger 7 is located between the condenser 3 and the subcooling heat exchanger 4. As a result, the heat exchanging amount Qex in the interior heat exchanger 7 is not changed when a heat exchanging amount Qsc (of which unit is [W] for example) in the subcooling heat exchanger 4 is reduced depending on an operation state of the vehicle air conditioner 100. The operation state of the vehicle air conditioner 100 is, for example, a state in which a volume of air passing through the warm air passage 102 is decreased.

In contrast, according to the first embodiment, as shown in FIG. 1, the first heat exchanging portion 71 of the interior heat exchanger 7 is located between the subcooling heat exchanger 4 and the decompressor 5. As a result, when a temperature of refrigerant flowing out of the condenser 3 is estimated to be fixed, the heat exchanging amount Qex is increased since the temperature difference ΔTex (refer to FIG. 7) between the refrigerants in the interior heat exchanger 7 increases when the heat exchanging amount Qsc in the subcooling heat exchanger 4 is reduced depending on the operation state of the vehicle air conditioner 100.

Figure 12:
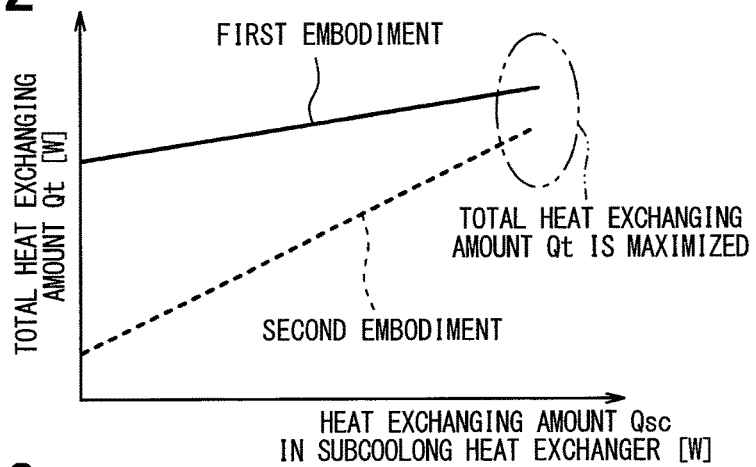
FIG. 12 is a diagram showing a relationship between a heat exchanging amount in a subcooling heat exchanger and a total heat exchanging amount of a heat exchanging amount in the subcooling heat exchanger and a heat exchanging amount in the interior heat exchanger, according to each of the first embodiment and the second embodiment.

The heat exchanging amount Qex in the interior heat exchanger 7 according to the first embodiment is larger as compared to that of the second embodiment, since a temperature (i.e., an evaporator outlet refrigerant temperature) of refrigerant in the outlet of the evaporator 6 is lower than a temperature (i.e., an evaporator blowing air temperature) (i.e., the air temperature TE) of air flowing out of the evaporator 6. As shown in FIG. 12, a total heat exchanging amount Qt according to the first embodiment is larger than a total heat exchanging amount Qt according to the second embodiment in a state in which the total heat exchanging amount Qt is maximized. The total heat exchanging amount Qt is a total amount of the heat exchanging amount in the subcooling heat exchanger 4 and the heat exchanging amount in the interior heat exchanger 7. FIG. 12 is a diagram illustrating a relationship between the heat exchanging amount Qsc in the subcooling heat exchanger 4 and the heat exchanging amount Qt in the interior heat exchanger 7 according to each of the first embodiment and the second embodiment.

In the above-described point of view, according to the second embodiment, the total heat exchanging amount Qt is drastically reduced as shown in FIG. 12 when the heat exchanging amount Qsc in the subcooling heat exchanger 4 is reduced depending on the operation state of the vehicle air conditioner 100. In contrast, according to the first embodiment, the total heat exchanging amount Qt is less reduced as compared to the second embodiment since the heat exchanging amount Qex in the interior heat exchanger 7 is increased when the heat exchanging amount Qsc in the subcooling heat exchanger 4 is reduced depending on the operation state of the vehicle air conditioner 100.

Figure 13:
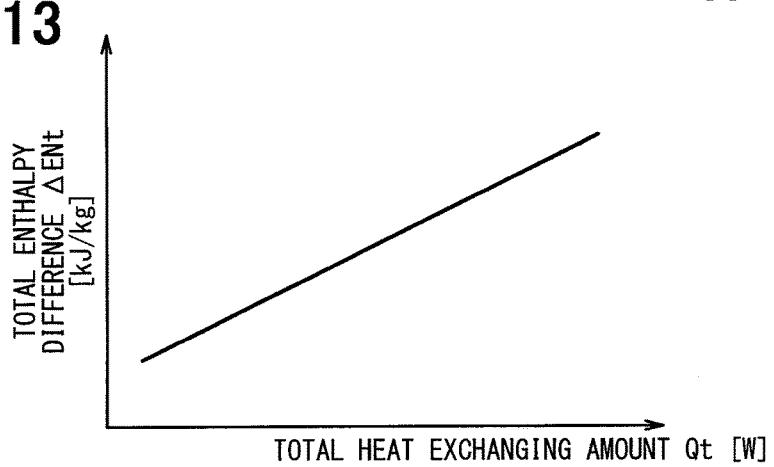
FIG. 13 is a graph showing a relationship between a total enthalpy difference of refrigerant in the subcooling heat exchanger and the interior heat exchanger, the total enthalpy difference being caused before the refrigerant is decompressed in a decompressor, and the total heat exchanging amount in the subcooling heat exchanger and the interior heat exchanger, according to each of the first embodiment and the second embodiment.
Figure 14:
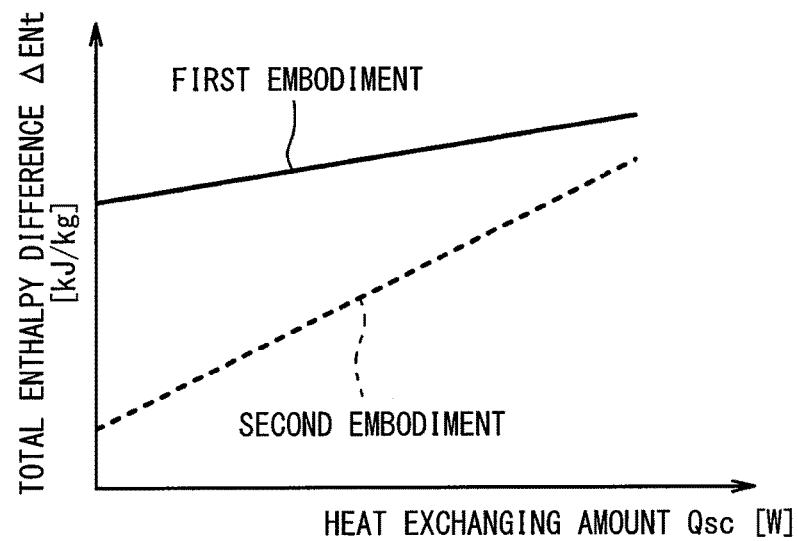
FIG. 14 is a graph showing a relationship between the heat exchanging amount in the subcooling heat exchanger shown in FIG. 12 and the total enthalpy different shown in FIG. 13, according to each of the first embodiment and the second embodiment.

According to both the first embodiment and the second embodiment, as shown in FIG. 13, an enthalpy decreasing degree of refrigerant due to the heat exchanges performed in the subcooling heat exchanger 4 and the interior heat exchanger 7 before the refrigerant is decompressed in the decompressor 5 is increased as the total heat exchanging amount Qt, which is the total amount of the heat exchanging amount in the subcooling heat exchanger 4 and the heat exchanging amount in the interior heat exchanger 7, increases. The enthalpy decreasing degree of refrigerant is, i.e., a total enthalpy difference $\Delta$ENt (refer to FIG. 6) between the subcooling heat exchanger 4 and the first heat exchanging portion 71 of the interior heat exchanger 7. Accordingly, as shown in FIG. 14, the total enthalpy difference $\Delta$ENt of the refrigerant according to the first embodiment is larger than that according to the second embodiment regardless of the heat exchanging amount Qsc in the subcooling heat exchanger 4, i.e., regardless of the operation state of the vehicle air conditioner 100. The total enthalpy difference $\Delta$ENt is an index of a degree regarding the power saving effect obtained by the refrigeration cycle device 1 due to the heat exchanges in the subcooling heat exchanger 4 and the interior heat exchanger 7. The power saving effect of the refrigeration cycle device 1 is improved as the total enthalpy difference $\Delta$ENt increases.

Figure 15:
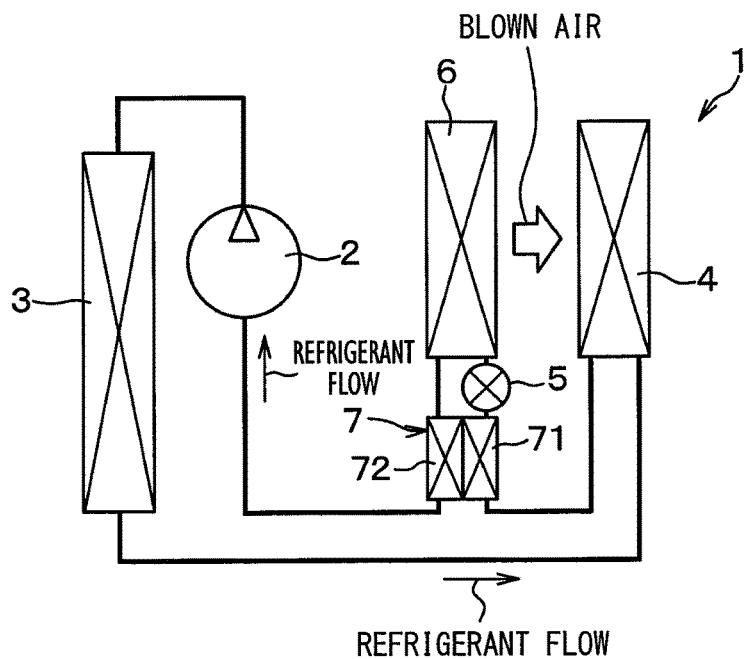
FIG. 15 is a schematic diagram illustrating the refrigeration cycle device reproduced on a computer, according to the first embodiment.
Figure 16:
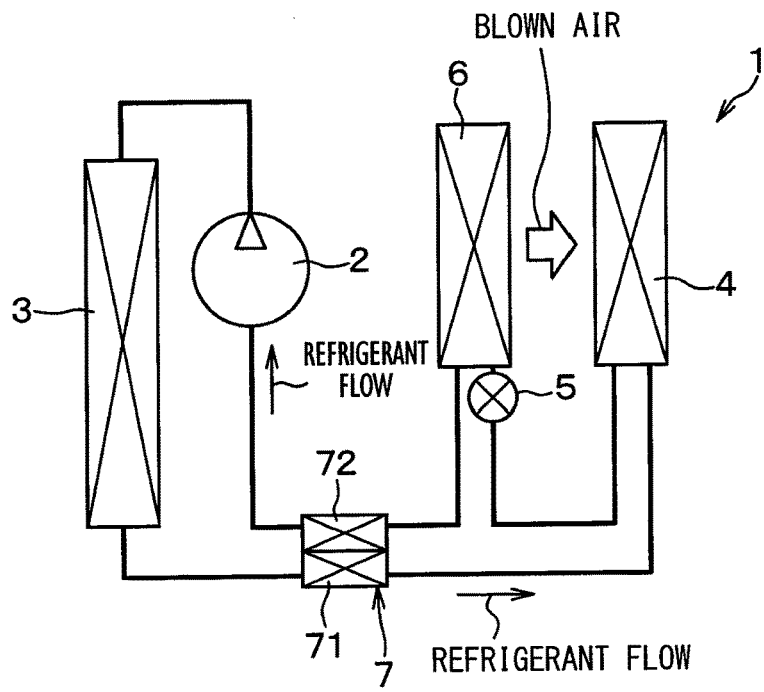
FIG. 16 is a schematic diagram illustrating the refrigeration cycle device reproduced on a computer, according to the second embodiment.

A simulation performed by a computer to confirm events shown in FIG. 12 through FIG. 14 will be described hereafter. FIG. 15 a schematic diagram illustrating the refrigeration cycle device 1 reproduced on the computer, according to the first embodiment. FIG. 16 a schematic diagram illustrating the refrigeration cycle device 1 reproduced on the computer, according to the second embodiment. The refrigeration cycle device 1 illustrated in FIG. 15 and the refrigeration cycle device 1 illustrated in FIG. 16 have the same configuration expect for a location of the interior heat exchanger 7. The simulation is performed under the fixed situation in which various conditions such as a temperature of air flowing out of the evaporator, the outside air temperature TAM, and a volume of air are set in advance.

Figure 17:
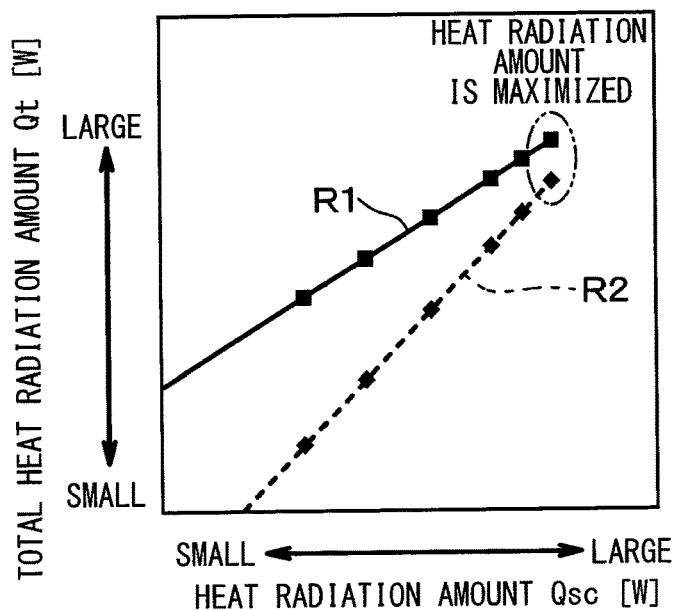
FIG. 17 is a diagram showing a relationship between a heat radiation amount from refrigerant in the subcooling heat exchanger and a total heat radiation amount from refrigerant in the subcooling heat exchanger and the first heat exchanging portion of the interior heat exchanger, according to each of the refrigeration cycle device shown in FIG. 15 and the refrigeration cycle device shown in FIG. 16.
Figure 18:
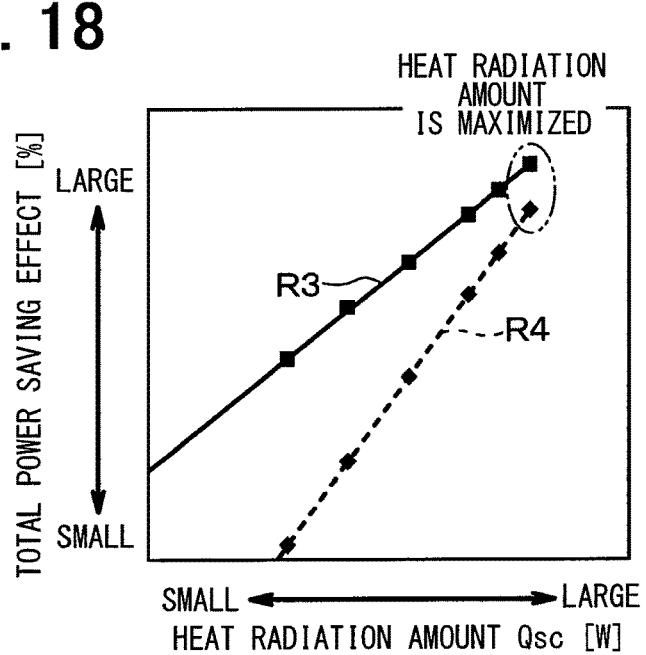
FIG. 18 is a diagram showing a relationship between a heat radiation amount from refrigerant in the subcooling heat exchanger and a total power saving effect performed by the subcooling heat exchanger and the interior heat exchanger, according to each of the refrigeration cycle device shown in FIG. 15 and the refrigeration cycle device shown in FIG. 16.

Correlations shown in FIG. 17 and FIG. 18 are found from the simulation. FIG. 17 is a diagram illustrating a relationship between the heat radiation amount Qsc (i.e., the heat exchanging amount Qsc in the subcooling heat exchanger 4) (refer to FIG. 12) radiated from refrigerant in the subcooling heat exchanger 4 and a total heat radiation amount (i.e., the total heat exchanging amount Qt) (refer to FIG. 12) that is a total amount of the heat radiation amount Qsc and a heat radiation amount radiated from refrigerant in the first heat exchanging portion 71 of the interior heat exchanger 7. FIG. 18 is a diagram illustrating a relationship between the heat radiation amount Qsc radiated from the refrigerant in the subcooling heat exchanger 4 and a total power saving effect EFt by the subcooling heat exchanger 4 and the interior heat exchanger 7. In FIG. 17 and FIG. 18, solid line R1 and solid line R3 show a simulation result in the refrigeration cycle device 1 shown in FIG. 15, and dashed line R2 and dashed line R4 show a simulation result in the refrigeration cycle device 1 shown in FIG. 16. The refrigeration cycle device 1 shown in FIG. 15 corresponds to the refrigeration cycle device 1 of the first embodiment. The refrigeration cycle device 1 shown in FIG. 16 corresponds to the refrigeration cycle device 1 of the second embodiment. A two-dot chain line in FIG. 17 and FIG. 18 shows the relationship when the total heat radiation amount is maximized.

According to the simulation results shown in FIG. 17 and FIG. 18, the total enthalpy difference $\Delta$ENt of the refrigerant is increased regardless of the heat exchanging amount Qsc in the subcooling heat exchanger 4, and the power saving effect obtained by the refrigeration cycle device 1 due to the heat exchanges in the subcooling heat exchanger 4 and the interior heat exchanger 7 is improved, according to the first embodiment as compared to the second embodiment.

As described above, according to the first embodiment, the first heat exchanging portion 71 of the interior heat exchanger 7 is disposed in the refrigeration path between the condenser 3 and the decompressor 5 and is located between the subcooling heat exchanger 4 and the decompressor 5. As a result, as described above referring to FIG. 12 through FIG. 18, the total enthalpy difference $\Delta$ENt (i.e., the enthalpy difference between the point PC and the point PE shown in FIG. 6) of refrigerant between the subcooling heat exchanger 4 and the first heat exchanging portion 71 of the interior heat exchanger 7 can be increased by the location of the first heat exchanging portion 71 according to the first embodiment, as compared to the second embodiment in which the first heat exchanging portion 71 is located between the condenser 3 and the subcooling heat exchanger 4. In other words, the power saving effect by the refrigeration cycle device 1 according to the first embodiment is improved as compared to the second embodiment. For example, the power saving effect can be maximized according to the first embodiment.

Third Embodiment

A third embodiment will be described hereafter. A part of the present embodiment different from the first embodiment will be described mainly.

Figure 19:
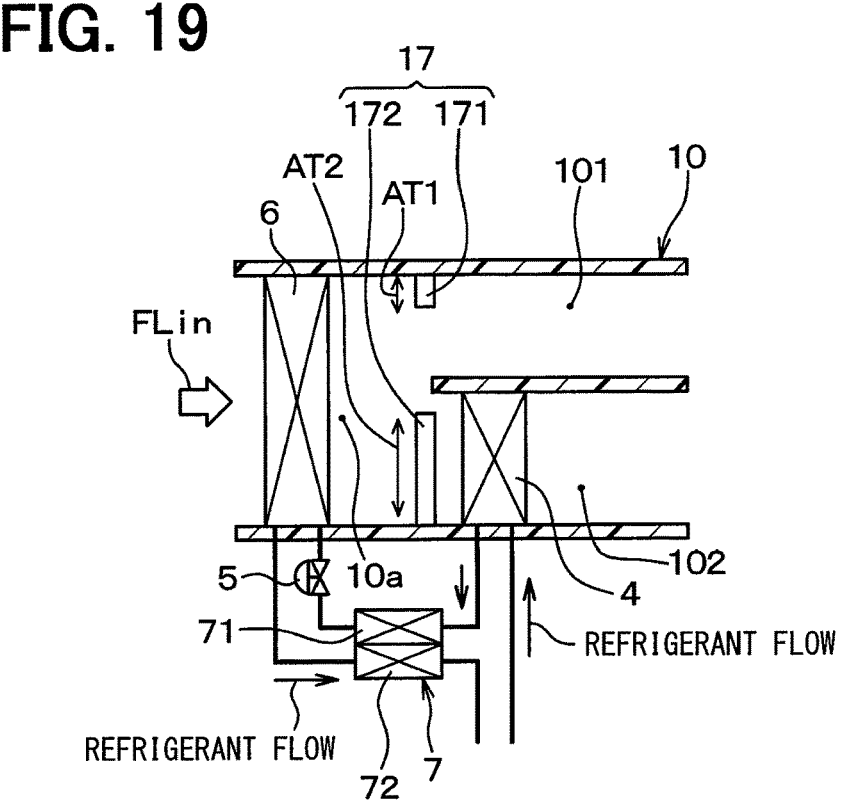
FIG. 19 is a schematic diagram illustrating a part of an inside of an air conditioning duct and a part of a configuration of a refrigeration cycle device, according to a third embodiment.

FIG. 19 is a schematic diagram illustrating an inside of the air conditioning duct 10 and a part of the configuration of the refrigeration cycle device 1 according to the present embodiment. An illustration in FIG. 19 is simplified as compared to that according to the first embodiment shown in FIG. 1, however a part that corresponds to a matter described in the first embodiment is assigned with the same reference number. For example, illustrations of the air conditioning duct 10 and the air mix door device 17 shown in FIG. 19 are simplified as compared to FIG. 1, however the configurations are the same as shown in FIG. 1. That is the same in FIG. 20 described later.

As shown in FIG. 19, the heater core 34 is not disposed in the air conditioning duct 10 according to the present embodiment. This aspect is different from the first embodiment. In FIG. 19, arrow AT1 shows a moving direction of the first door 171, and arrow AT2 shows a moving direction of the second door 172.

According to the present embodiment, the same effects as the first embodiment provided by a common configuration with the first embodiment can be obtained. Although the present embodiment is made by modifying the first embodiment, the present embodiment may be combined with the above-described second embodiment.

Fourth Embodiment

A fourth embodiment will be described hereafter. A part of the present embodiment different from the first embodiment will be described mainly.

Figure 20:
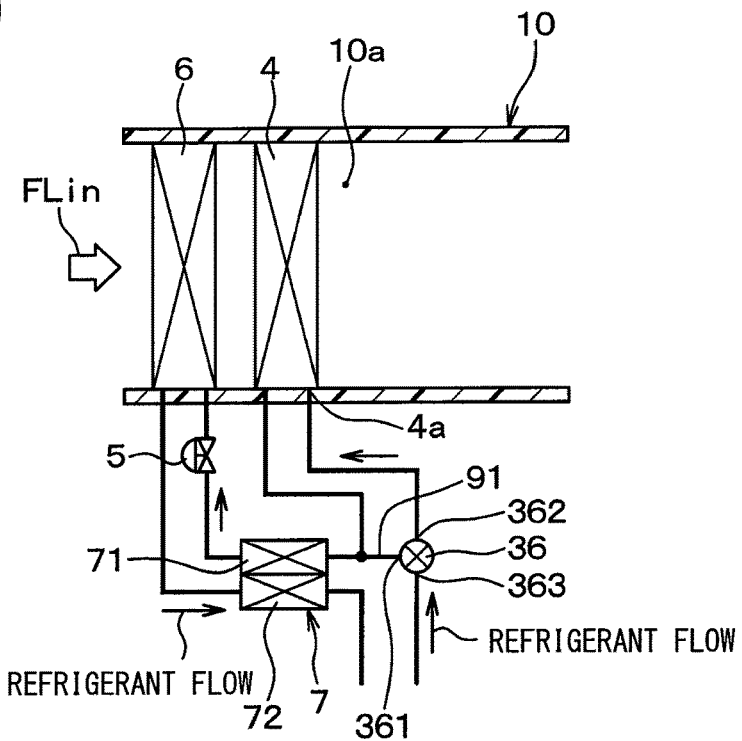
FIG. 20 is a schematic diagram illustrating a part of an inside of an air conditioning duct and a part of a configuration of a refrigeration cycle device, according to a fourth embodiment.

FIG. 20 is a schematic diagram illustrating an inside of the air conditioning duct 10 and a part of the configuration of the refrigeration cycle device 1 according to the present embodiment. As shown in FIG. 20, the heater core 34 and the air mix door device 17 are omitted according to the present embodiment. In addition, the cool air bypass passage 101 and the warm air passage 102 are not provided in the air conditioning duct 10, and the refrigeration cycle device 1 has a bypass pipe 91 as a part of the refrigerant pip 9 and a passage switching valve 36. Those aspects are different from the first embodiment.

The subcooling heat exchanger 4 is arranged to across an entire width of the air passage 10a immediately downstream of the evaporator 6 in the air conditioning duct 10 since the cool air bypass passage 101 and the warm air passage 102 are not provided. As a result, an entire volume of air flowing out of the evaporator 6 flows through the subcooling heat exchanger 4. Therefore, the subcooling heat exchanger 4 performs a heat exchange between refrigerant from the condenser 3 (refer to FIG. 1) and air flowing from the evaporator 6 when the refrigerant flows into the subcooling heat exchanger 4. That is, the subcooling heat exchanger 4 causes the refrigerant to radiate heat and heats the air flowing from of the evaporator 6.

The bypass pipe 91 configures a refrigerant bypass passage that guides refrigerant flowing from the condenser 3 (refer to FIG. 1) to the first heat exchanging portion 71 of the interior heat exchanger 7 to bypass the subcooling heat exchanger 4. Specifically, an upstream end of the bypass pipe 91 is connected to the passage switching valve 36 and a downstream end of the bypass pipe 91 is connected to the first heat exchanging portion 71 of the interior heat exchanger 7.

The passage switching valve 36 is an electromagnetic three-way valve that connects refrigerant passages based on the control signals from the air conditioning ECU 50 (refer to FIG. 4). The passage switching valve 36 is disposed in a refrigerant path between the condenser 3 (refer to FIG. 1) and the subcooling heat exchanger 4. The passage switching valve 36 has a first outlet port 361, a second outlet port 362, and an inlet port 363. The first outlet port 361 is connected to the upstream end of the bypass pipe 91, the second outlet port 362 is connected to a refrigerant inlet 4a of the subcooling heat exchanger 4, and the inlet port 363 is connected to the refrigerant outlet 3a of the condenser 3 (refer to FIG. 1).

The passage switching valve 36 is located at a first switching position or a second switching position. The first outlet port 361 and the inlet port 363 communicate with each other, and the second outlet port 362 is closed, when the passage switching valve 36 is located at the first switching position. The first outlet port 361 is closed, and the second outlet port 362 and the inlet port 363 communicate with each other, when the passage switching valve 36 is located at the second switching position. Accordingly, the passage switching valve 36 blocks an inflow of refrigerant to the subcooling heat exchanger 4 and opens the bypass pipe 91 when being located at the first switching position. The passage switching valve 36 causes refrigerant to flow into the subcooling heat exchanger 4 and closes the bypass pipe 91 when being located at the second switching position.

The passage switching valve 36 functions as a heat radiation amount adjuster that adjusts the heat radiation amount radiated from refrigerant in the subcooling heat exchanger 4 by being displaced between the first switching position and the second switching position. In other words, the heat radiation amount is increased or reduced by the passage switching valve 36. Specifically, the passage switching valve 36 decreases the heat radiation amount when being located at the first switching position as compared to the heat radiation amount when being located at the second switching position. For example, the passage switching valve 36 is located at the first switching position when the vehicle air conditioner 100 is operated in the MAXCOOL, and is located at the second switching position when the vehicle air conditioner 100 is operated in the MAXHOT.

According to the present embodiment, the same effects as the first embodiment provided by a common configuration with the first embodiment can be obtained. Although the present embodiment is made by modifying the first embodiment, the present embodiment may be combined with the above-described second embodiment.

(Other Modifications)

(1) According to the above-described embodiments, the first heat exchanging pathways 712 are connected to each other in parallel in the interior heat exchanger 7, however may be connected to each other in series. Similarly, the second heat exchanging pathways 722 may be connected to each other in series, although the second heat exchanging pathways 722 are connected to each other in parallel according to the above-described embodiments.

Figure 21:
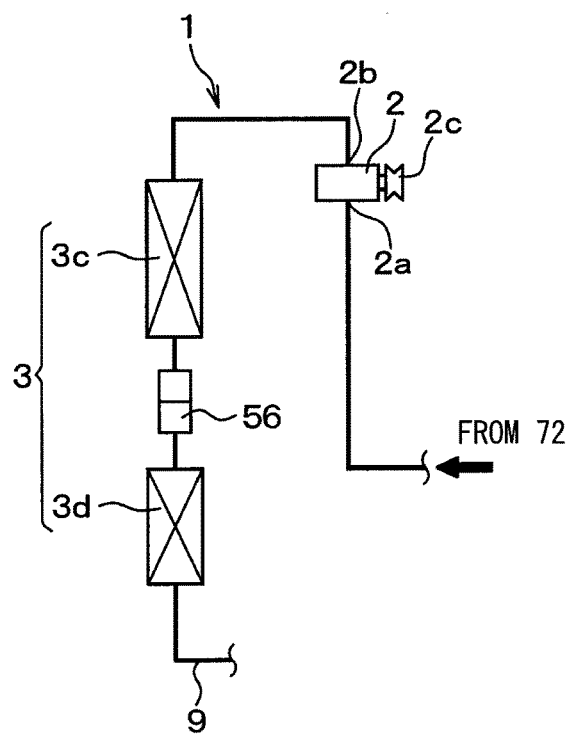
FIG. 21 is an abstract diagram illustrating a part of a schematic configuration of a refrigeration cycle device according to a modification example that further has a receiver with respect to the first embodiment and the second embodiment.

(2) The refrigeration cycle device 1 has the condenser 3 according to the above-described first embodiment shown in FIG. 1 and the above-described second embodiment shown in FIG. 10. However, the condenser 3 may be a so-called subcooling condenser that has a condensing portion 3c as the first heat exchanging portion and a subcooling portion 3d as the second heat exchanging portion located downstream of the condensing portion 3c in a flow direction of refrigerant. In this case, a receiver 56 as a gas-liquid separator is disposed between the condensing portion 3c and the subcooling portion 3d. The receiver 56 separates refrigerant flowing out of the condensing portion 3c into a gas-phase refrigerant and a liquid-phase refrigerant, causes the liquid-phase refrigerant to flow to the subcooling portion 3d, and stores an excess refrigerant therein. FIG. 21 is an abstract diagram illustrating a part of a schematic configuration of the refrigeration cycle device 1 according to a modification example that further has the receiver 56 with respect to the first embodiment and the second embodiment.

Figure 22:
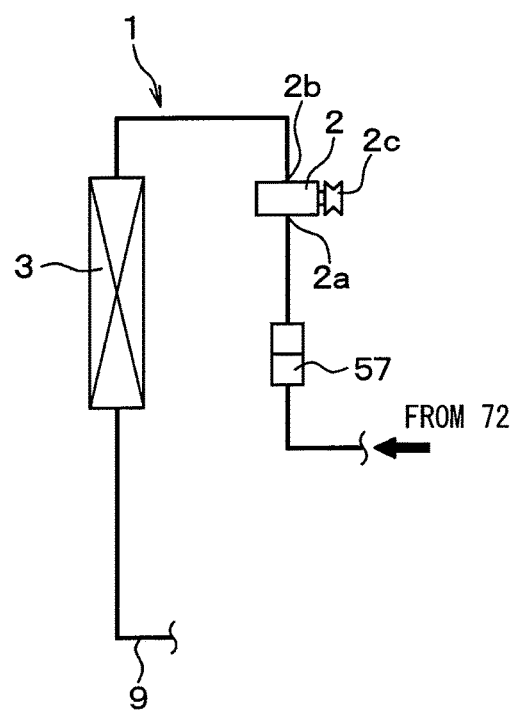
FIG. 22 is an abstract diagram illustrating a part of a schematic configuration of a refrigeration cycle device according to a modification example that further has an accumulator with respect to the first embodiment and the second embodiment.

(3) The refrigeration cycle device 1 does not have an accumulator 57 as a gas-liquid separator according to the above-described first embodiment shown in FIG. 1 and the above-described second embodiment shown in FIG. 10. However, the accumulator 57 may be disposed in a refrigerant path between the second heat exchanging portion 72 (refer to FIG. 1 and FIG. 10) of the interior heat exchanger 7 and the compressor 2 as shown in FIG. 22. The accumulator 57 separates refrigerant flowing from the second heat exchanging portion 72 of the interior heat exchanger 7 into a gas-phase refrigerant and a liquid-phase refrigerant, causes the gas-phase refrigerant to flow to the compressor 2, and stores an excess refrigerant therein. FIG. 22 is an abstract diagram illustrating a part of a schematic configuration of the refrigeration cycle device 1 according to a modification example that further has the accumulator 57 with respect to the first embodiment and the second embodiment.

(4) According to the above-described embodiments, the subcooling heat exchanger 4 is disposed in the air conditioning duct 10 and directly heats air by using heat of refrigerant flowing in the subcooling heat exchanger 4. However, the subcooling heat exchanger 4 may be located outside the air conditioning duct 10. In this case, a heating heat exchanger is disposed in the warm air passage 102 provided in the air conditioning duct 10 instead of the subcooling heat exchanger 4, and a heat exchanging medium such as water is caused to flow between the heating heat exchanger and the subcooling heat exchanger 4. The subcooling heat exchanger 4 transmits the heat of the refrigerant to the heat exchanging medium such that air passing through the heating heat exchanger is heated through the heat exchanging medium. That is, the subcooling heat exchanger 4 may heat air indirectly.

(5) According to the above-described embodiments, the vehicle air conditioner 100 is mounted in a vehicle having the engine 30, however may be mounted in a hybrid vehicle having an electric motor for traveling instead of the engine 30. Alternatively, the vehicle air conditioner 100 may be mounted in an electric vehicle having only an electric motor as a power source for traveling.

The engine 30 functions as a heat generator mounted in the vehicle. However, a device such as an electric motor, a battery device supplying an electric power to the electric motor, and a driving circuit that controls an operation of the electric motor may function as a heat generator mounted in the vehicle when the vehicle in which the vehicle air conditioner 100 is mounted has an electric motor.

(6) According to the above-described first through third embodiments, the vehicle air conditioner 100 has the air mix door device 17. However, the air mix door device 17 may be another device other than a door mechanism as long as being capable of controlling a ratio between a volume of air flowing to the cool air bypass passage 101 and a volume of air flowing to the warm air passage 102.

(7) According to the above-described embodiments, the compressor 2 is operated by a driving power from the engine 30. However, the compressor 2 is not limited to be operated by the driving power. The compressor 2 may not be connected to the engine 30 and therein have an electric motor instead, and may be operated by a driving power from the electric motor.

(8) According to the above-described embodiments, configurations of heat exchangers 3, 4, 6, 34 included in the vehicle air conditioner 100 are not limited. The heat exchangers 3, 4, 6, 34 may be a corrugated fin type heat exchanger in which a corrugated fin is disposed between heat exchanging tubes, or may be another heat exchanger other than the corrugated fin type heat exchanger.

(9) According to the above-described first through third embodiment, the air mix door device 17 is configured by two doors 171, 172. However, the air mix door device 17 may be configured by a single door or three or more doors, or may have a mechanical configuration other than a door.

(10) According to the above-described embodiments, the control processing shown in the flow chart in FIG. 5 is performed by a computer program, however may be configured by a hard logic.

The present disclosure is not limited to the above-described embodiments and can be modified within the scope of the present disclosure. The above-described embodiments are not unrelated to each other and can be combined with each other except for a case where the combination is clearly improper. In the above-described embodiments, it is to be understood that elements constituting the embodiments are not necessary except for a case of being explicitly specified to be necessary and a case of being considered to be absolutely necessary in principle.

Even when a factor such as a quantity of elements, a value, an amount, a range is mentioned in the above-described embodiments, it is to be understood that the factor is not limited to a specific value except for a case of being explicitly specified to be necessary and a case of being considered to be absolutely necessary in principle. Even when a feature such as a material forming a member, a shape of a member, a positional relation of members, it is to be understood that such feature is not limited to a specific material, shape, positional relation, or the like except for a case of being explicitly specified to be necessary and a case of being considered to be absolutely necessary in principle.

The invention claimed is:

1. A refrigeration cycle device comprising:
   a compressor that draws a refrigerant and discharges the refrigerant after compressing the refrigerant;
   a radiator that causes the refrigerant, which is discharged by the compressor, to radiate heat;
   an auxiliary heat exchanger that performs a heat exchange between the refrigerant flowing from the radiator and air to be blown to an air-conditioning target space and that causes the refrigerant to further radiate heat;
   a decompressor that decompresses the refrigerant flowing from the auxiliary heat exchanger;
   an evaporator that performs a heat exchange between air and the refrigerant after being decompressed in the decompressor before the air is heated by heat that is radiated from the refrigerant in the auxiliary heat exchanger, the evaporator that cools the air before being heated and evaporates the refrigerant, the evaporator causing the refrigerant after exchanging heat to flow to the compressor; and
   an interior heat exchanger that has a first heat exchanging portion and a second heat exchanging portion and performs a heat exchange between refrigerant flowing in the first heat exchanging portion and refrigerant flowing in the second heat exchanging portion, the first heat exchanging portion is disposed in a refrigerant path between the radiator and the decompressor and is connected to the auxiliary heat exchanger in series, the second heat exchanging portion is disposed in a refrigerant path between the evaporator and the compressor, wherein
   the first heat exchanging portion is located between the auxiliary heat exchanger and the decompressor in the refrigerant path between the radiator and the decompressor.

2. The refrigeration cycle device according to claim 1, wherein
   the first heat exchanging portion is located between the radiator and the auxiliary heat exchanger in the refrigerant path between the radiator and the decompressor.

3. The refrigeration cycle device according to claim 1, wherein
   the evaporator is disposed in an air conditioning duct that delivers the air into a vehicle compartment as the air-conditioning target space, and
   the auxiliary heat exchanger is disposed in the air conditioning duct and located downstream of the evaporator in a flow direction of the air.

4. The refrigeration cycle device according to claim 1, wherein
   a heat radiation amount radiated from the refrigerant in the auxiliary heat exchanger is increased or decreased by a heat radiation amount adjuster.

5. The refrigeration cycle device according to claim 4, further comprising:
   a refrigerant bypass passage that guides the refrigerant to bypass the auxiliary heat exchanger; and
   a passage switching valve, as the heat radiation amount adjuster, that is capable of being positioned at a first switching position or a second switching position, the passage switching valve that blocks an inflow of the refrigerant into the auxiliary heat exchanger and opens the refrigerant bypass passage when being positioned at the first switching position, and that causes the refrigerant to flow into the auxiliary heat exchanger and closes the refrigerant bypass passage when being positioned at the second switching position.

6. The refrigeration cycle device according to claim 3, wherein the heat radiation amount radiated from the refrigerant in the auxiliary heat exchanger is increased or decreased by opening or closing a warm air passage that is provided in the air conditioning duct and that guides the air flowing from the evaporator to flow to the auxiliary heat exchanger, the warm air passage being opened or closed by an opening/closing device disposed in the air conditioning duct, and the opening/closing device reduces the heat radiation amount when the warm air passage is closed as compared to a heat radiation amount when the warm air passage is open.

7. The refrigeration cycle device according to claim 1, wherein the first heat exchanging portion has a plurality of first stacked bodies that have a flat shape and provide a pathway in which the refrigerant flows, and the second heat exchanging portion has a plurality of second stacked bodies that provide a pathway in which the refrigerant flows, the plurality of first stacked bodies and the plurality of second stacked bodies being stacked alternately.

8. The refrigeration cycle device according to claim 1, wherein the refrigeration cycle device is mounted in a vehicle.

* * * * *